United States Patent
Agiwal et al.

(10) Patent No.: US 11,546,853 B2
(45) Date of Patent: Jan. 3, 2023

(54) METHODS AND APPARATUS FOR MONITORING WAKE UP SIGNAL

(71) Applicant: Samsung Electronics Co., Ltd., Suwon-si (KR)

(72) Inventors: Anil Agiwal, Suwon-si (KR); Hyunjeong Kang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/034,570

(22) Filed: Sep. 28, 2020

(65) Prior Publication Data

US 2021/0099954 A1 Apr. 1, 2021

Related U.S. Application Data

(60) Provisional application No. 62/908,831, filed on Oct. 1, 2019, provisional application No. 62/913,615, filed on Oct. 10, 2019.

(30) Foreign Application Priority Data

Sep. 28, 2020 (KR) ........................ 10-2020-0125804

(51) Int. Cl.
*H04W 52/02* (2009.01)
*H04W 4/40* (2018.01)
(Continued)

(52) U.S. Cl.
CPC ......... *H04W 52/0229* (2013.01); *H04W 4/40* (2018.02); *H04W 72/042* (2013.01);
(Continued)

(58) Field of Classification Search
CPC ............... H04W 52/0229; H04W 4/40; H04W 72/042; H04W 72/0453; H04W 72/0493;
(Continued)

(56) References Cited

U.S. PATENT DOCUMENTS

2015/0382189 A1   12/2015   Zhang et al.
2016/0044006 A1   2/2016   Luft et al.
(Continued)

OTHER PUBLICATIONS

Qualcomm Incorporated, 'PDCCH-based power saving channel design', R1-1909275, 3GPP TSG RAN WG1 #98, Prague, CZ, Aug. 17, 2019.
(Continued)

*Primary Examiner* — Omar J Ghowrwal
(74) *Attorney, Agent, or Firm* — Jefferson IP Law, LLP

(57) ABSTRACT

The disclosure relates to a communication method and system for converging a 5$^{th}$ generation (5G) communication system for supporting higher data rates beyond a 4$^{th}$ generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method and apparatus for monitoring wakeup signal and method and apparatus for securing unicast V2X communication are provided.

12 Claims, 22 Drawing Sheets

(51) Int. Cl.
  *H04W 72/04* (2009.01)
  *H04W 76/11* (2018.01)
  *H04W 76/27* (2018.01)
  *H04W 76/28* (2018.01)
  *H04W 76/15* (2018.01)
(52) U.S. Cl.
  CPC ............... *H04W 72/0453* (2013.01); *H04W 72/0493* (2013.01); *H04W 76/11* (2018.02); *H04W 76/27* (2018.02); *H04W 76/28* (2018.02); *H04W 76/15* (2018.02); *Y02D 30/70* (2020.08)
(58) Field of Classification Search
  CPC ..... H04W 76/11; H04W 76/27; H04W 76/28; H04W 76/15; Y02D 30/70
  See application file for complete search history.

(56) References Cited

U.S. PATENT DOCUMENTS

| | | |
|---|---|---|
| 2016/0205555 A1 | 7/2016 | Agiwal et al. |
| 2017/0251518 A1 | 8/2017 | Agiwal et al. |
| 2018/0332655 A1 | 11/2018 | Ang et al. |
| 2019/0254110 A1 | 8/2019 | He et al. |
| 2021/0068055 A1* | 3/2021 | Nam ................. H04L 5/10 |
| 2021/0368448 A1* | 11/2021 | Li .................. H04W 72/0453 |
| 2021/0377852 A1* | 12/2021 | Zhou ............... H04W 72/042 |
| 2021/0377864 A1* | 12/2021 | Li .................. H04W 52/0219 |

OTHER PUBLICATIONS

Vivo, 'PDCCH-based power saving signal/channel design', R1-1908170, 3GPP TSG RAN WG1 #98, Prague, CZ, Aug. 17, 2019.
Samsung, 'PDCCH-based power saving signal/channel', R1-1908505, 3GPP TSG RAN WG1 #98, Prague, CZ, Aug. 16, 2019.
Nokia et al., 'PDCCH-based power saving signal/channel', R1-1909339, 3GPP TSG RAN WG1 #98, Prague, CZ, Aug. 16, 2019.
International Search Report dated Dec. 30, 2020, issued in International Patent Application No. PCT/KR2020/013248.
Vivo: "PDCCH-based power saving signal/channel design", 3GPP Draft; R1-1904103, 3rd Generation Partnership Project (3GPP), Mobile, Competence Centre ; 650, Route Des Lucioles ; F-06921 Sophia-Antipolis Cedex ; France, Apr. 2, 2019 (Apr. 2, 2019), pp. 1-7, XP051707113.
European Search Report dated May 30, 2022, issued in European Application No. 20871441.0.

* cited by examiner

METHODS AND APPARATUS FOR MONITORING WAKE UP SIGNAL

CROSS-REFERENCE TO RELATED APPLICATION(S)

This application is based on and claims priority under 35 U.S.C. § 119(e) of a U.S. Provisional application Ser. No. 62/908,831, filed on Oct. 1, 2019, of a U.S. Provisional application Ser. No. 62/913,615, filed on Oct. 10, 2019, in the U.S. Patent and Trademark Office, and under 35 U.S.C. § 119(a) of a Korean patent application number 10-2020-0125804, filed on Sep. 28, 2020, in the Korean Intellectual Property Office, the disclosure of each of which is incorporated by reference herein in its entirety.

BACKGROUND

1. Field

The disclosure relates to a wireless communication system. More particularly, the disclosure relates to an apparatus, a method and a system for monitoring wake up signal (WUS) in wireless communication system. Also, the disclosure relates to an apparatus, a method and a system for securing unicast vehicle to everything (V2X) communication in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'. The 5G communication system is considered to be implemented in higher frequency (millimeter wave (mm Wave)) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there have been various studies on WUS in 5G communication system recently. Also, there are needs to enhance V2X communication in various ways recently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a 5th generation (5G) communication system for supporting higher data rates beyond a 4th generation (4G).

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, a radio resource control (RRC) message including a physical downlink control channel (PDCCH) configuration for a downlink bandwidth part (BWP) of a serving cell, the PDCCH configuration including search space configuration information and control resource set (CORESET) configuration information, wherein a search space configuration of the search space configuration information corresponds to a CORESET of the CORESET configuration information and includes information to be used for a wakeup signal (WUS), identifying a PDCCH monitoring occasion for the WUS based on the search space configuration and the CORESET, and receiving, from the base station, downlink control information including the WUS by monitoring the PDCCH monitoring occasion, wherein the downlink control information being received based on a power saving radio network temporary identifier (PS-RNTI) which is common for BWPs of the serving cell.

In accordance with another aspect of the disclosure, a method performed by a base station is provided. The method includes transmitting, to a terminal, a radio resource control (RRC) message including a physical downlink control channel (PDCCH) configuration for a downlink bandwidth part (BWP) of a serving cell, the PDCCH configuration including search space configuration information and control resource set (CORESET) configuration information, wherein a search space configuration of the search space configuration information corresponds to a CORESET of the CORESET configuration information and includes information to be used for a wakeup signal (WUS), and transmitting, to the terminal, downlink control information including the WUS in a PDCCH monitoring occasion for the WUS identified based on the search space configuration and the CORESET, wherein the downlink control information being transmitted based on a power saving radio network temporary identifier (PS-RNTI) which is common for BWPs of the serving cell.

In accordance with another aspect of the disclosure, a terminal is provided. The terminal includes a transceiver configured to transmit and receive a signal, and a controller configured to a transceiver configured to transmit and receive a signal, and a controller configured to receive, from a base station, a radio resource control (RRC) message including a physical downlink control channel (PDCCH) configuration for a downlink bandwidth part (BWP) of a serving cell, the PDCCH configuration including search space configuration information and control resource set (CORESET) configuration information, wherein a search space configuration of the search space configuration information corresponds to a CORESET of the CORESET configuration information and includes information to be used for a wakeup signal (WUS), identify a PDCCH monitoring occasion for the WUS based on the search space configuration and the CORESET, and receive, from the base station, downlink control information including the WUS by monitoring the PDCCH monitoring occasion, wherein the downlink control information being received based on a power saving radio network temporary identifier (PS-RNTI) which is common for BWPs of the serving cell.

In accordance with another aspect of the disclosure, a base station is provided. The base station includes a transceiver configured to transmit and receive a signal, and a controller configured to a transceiver configured to transmit and receive a signal, and a controller configured to transmit, to a terminal, a radio resource control (RRC) message including a physical downlink control channel (PDCCH) configuration for a downlink bandwidth part (BWP) of a serving cell, the PDCCH configuration including search space configuration information and control resource set (CORESET) configuration information, wherein a search space configuration of the search space configuration information corresponds to a CORESET of the CORESET configuration information and includes information to be used for a wakeup signal (WUS), and transmit, to the terminal, downlink control information including the WUS in a PDCCH monitoring occasion for the WUS identified based on the search space configuration and the CORESET, wherein the downlink control information being transmitted based on a power saving radio network temporary identifier (PS-RNTI) which is common for BWPs of the serving cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
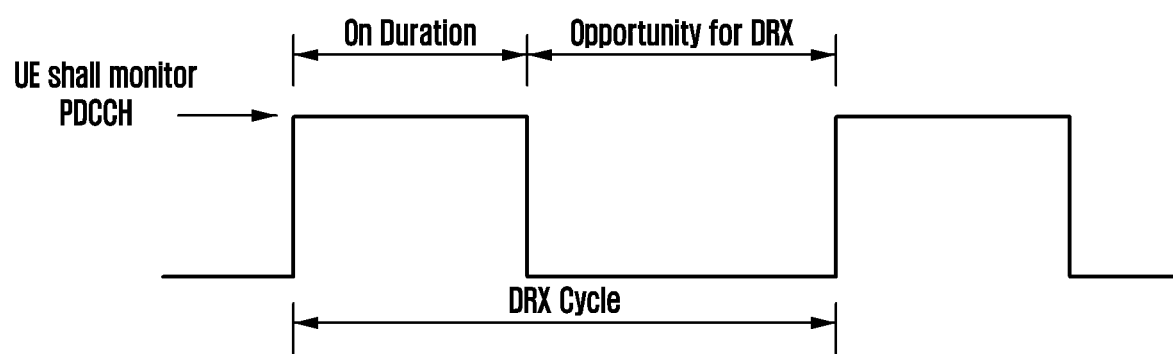
FIG. 1A illustrates an example of a discontinuous reception (DRX) cycle in a radio resource control (RRC) connected state of next generation radio (NR) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, a base transceiver station (BTS), a node B (NB), evolved NB (eNB), an access point (AP), a 5G NB (5GNB), or a next generation node B (gNB).

The "UE" is an entity communicating with a BS and may be referred to as UE, device, a mobile station (MS), a mobile equipment (ME), or a terminal.

Embodiment 1—Apparatus and Method for Monitoring Wake Up Signal

In the recent years several broadband wireless technologies have been developed to meet the growing number of broadband subscribers and to provide more and better applications and services. The $2^{nd}$ generation wireless communication system has been developed to provide voice services while ensuring the mobility of users. $3^{rd}$ generation wireless communication system supports not only the voice service but also data service. In recent years, the $4^{th}$ generation wireless communication system has been developed to provide high-speed data service. However, currently, the fourth generation wireless communication system suffers from lack of resources to meet the growing demand for high speed data services. So $5^{th}$ generation wireless communication system is being developed to meet the growing demand for high speed data services, support ultra-reliability and low latency applications.

The $5^{th}$ generation wireless communication system will be implemented not only in lower frequency bands but also in higher frequency (mm Wave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the $5^{th}$ generation wireless communication system is expected to address different use cases having quite different requirements in terms of data rate, latency, reliability, mobility etc. However, it is expected that the design of the air-interface of the $5^{th}$ generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL), etc. The eMBB requirements like tens of Gbps data rate, low latency, high mobility so on and so forth address the market segment representing the wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the $5^{th}$ generation wireless communication system operating in higher frequency (mm Wave) bands, a UE and a gNB communicates with each other using Beamforming Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as TX beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming A receiver can also make plurality of RX beam patterns of different directions. Each of these receive patterns can be also referred as RX beam.

The $5^{th}$ generation wireless communication system (also referred as next generation radio or NR), supports stand-alone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either E-UTRA (Evolved Universal Mobile Telecommunications System (UMTS) Terrestrial Radio Access) (i.e. if the node is an ng-eNB) or NR access (i.e. if the node is a gNB). In NR for a UE in RRC_CONNECTED not configured with carrier aggregation (CA)/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the Primary Cell (PCell) and optionally one or more Secondary Cells (SCells). In NR the term Secondary Cell Group (SCG) refers to a group of serving cells associated with the Secondary Node, comprising of the Primary SCG Cell (PS Cell) and optionally one or more SCells. In NR PCell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. PSCell refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the 5th generation wireless communication system (also referred as next generation radio or NR), next generation node B (gNB) or base station in cell broadcast Synchronization Signal and physical broadcast channel (PBCH) block (SSB) consists of primary synchronization signal (PSS) and secondary synchronization signal (SSS) and system information. System information includes common parameters needed to communicate in cell. In the 5th generation wireless communication system (also referred as next generation radio or NR), System Information (SI) is divided into the master information block (MIB) and a number of system information blocks (SIBs) where:

- the MIB is always transmitted on the PBCH with a periodicity of 80 ms and repetitions made within 80 ms and it includes parameters that are needed to acquire SIB1 from the cell;
- the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;
- SIBs other than SIB1 are carried in SystemInformation (SI) messages, which are transmitted on the DL-SCH. Only SIBs having the same periodicity can be mapped to the same SI message.

In the fifth generation wireless communication system (or NR), Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid automatic repeat request (HARQ) information related to DL-SCH; Uplink scheduling grants containing at least modulation and coding format, resource allocation, and hybrid-ARQ information related to uplink shared channel (UL-SCH). In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In NR, a list of search space configurations are signaled by the gNB for each configured bandwidth part (BWP) wherein each search configuration is uniquely identified by an identifier. Identifier of search space configuration to be used for specific purpose such as paging reception, SI reception, random access response (RAR) reception is explicitly signaled by the gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation 1 below:

$$(y*(\text{number of slots in a radio frame}) + x - \text{Monitoring-offset-PDCCH-slot}) \bmod (\text{Monitoring-periodicity-PDCCH-slot}) = 0; \quad \text{equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of CORESET configuration associated with it. A list of CORESET configurations are signaled by the gNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each CORESET configuration is associated with a list of TCI (Transmission configuration indicator) states. One DL reference signal (RS) identifier (ID) (SSB or channel state information reference signal (CSI-RS)) is configured per TCI state. The list of TCI states corresponding to a CORESET configuration is signaled by the gNB via RRC signaling. One of the TCI state in TCI state list is activated and indicated to the UE by the gNB. TCI state indicates the DL TX beam (DL TX beam is quasi-collocated (QCLed) with SSB/CSI RS of TCI state) used by the gNB for transmission of PDCCH in the PDCCH monitoring occasions of a search space.

In NR bandwidth adaptation (BA) is supported. With BA, the receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP).

BA is achieved by configuring the RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, the UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC) entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

FIG. 1A illustrates an example of a discontinuous reception (DRX) cycle in an RRC connected state of NR according to an embodiment of the disclosure.

Referring to FIG. 1A, in NR a UE in RRC connected state may be configured with a Discontinuous Reception (DRX). A DRX cycle consists of an 'On Duration' during which the UE should monitor the scheduling channel i.e. PDCCH and a 'DRX Period' during which a UE can skip monitoring PDCCH addressed to certain RNTIs for battery saving purposes. The MAC entity in the UE may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI.

In the DRX cycle, on-duration is the duration that the UE waits for, after waking up, to receive PDCCHs. If the UE successfully decodes a PDCCH, the UE stays awake and starts the inactivity timer. Inactivity-timer is the duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions). The active time in DRX cycle is the total duration that the UE monitors the PDCCH. This includes the "on-duration" of the DRX cycle, the time UE is performing continuous reception while the inactivity timer has not expired, and the time when the UE is performing continuous reception while waiting for a retransmission opportunity.

Serving Cells may be configured by RRC in two groups. When RRC does not configure a secondary DRX group, there is only one DRX group. When two DRX groups are configured each group of Serving Cells, which is called a DRX group, is configured by RRC with its own set of parameters: drx-onDurationTimer, drx-InactivityTimer. When two DRX groups are configured, the two groups share the following parameter values: drx-SlotOffset, drx-RetransmissionTimerDL, drx-RetransmissionTimerUL, drx-LongCycleStartOffset, drx-ShortCycle (optional), drx-ShortCycleTinier (optional), drx-HARQ-RTT-TimerDL, and drx-HARQ-RTT-TimerUL.

When a DRX cycle is configured, the Active Time for Serving Cells in a DRX group includes the time while: drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer or msgB-ResponseWindow is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

The UE can be configured with a short DRX cycle and a long DRX cycle. Upon expiry of drx-InactivityTimer, if the Short DRX cycle is configured: the UE start or restart drx-ShortCycleTimer in the first symbol after the expiry of drx-InactivityTimer and uses the Short DRX Cycle. if the Short DRX cycle is not configured, the UE uses the Long DRX cycle. When the drx-ShortCycleTimer expires: the UE uses the Long DRX cycle.

If a DRX Command MAC CE is received by the UE and if the Short DRX cycle is configured: the UE start or restart drx-ShortCycleTimer in the first symbol after the end of DRX Command MAC CE reception and uses the Short DRX Cycle. If a DRX Command MAC CE is received by the UE and if the Short DRX cycle is not configured, the UE uses the Long DRX cycle. If a Long DRX Command MAC CE is received: the UE stops drx-ShortCycleTimer and uses the Long DRX cycle.

If the Short DRX Cycle is used, and [(SFN×10)+subframe number] modulo (drx-ShortCycle)=(drx-StartOffset) modulo (drx-ShortCycle): drx-onDurationTimer is started after drx-SlotOffset from the beginning of the subframe. if the Long DRX Cycle is used, and [(SFN×10)+subframe number] modulo (drx-LongCycle)=drx-StartOffset, drx-onDurationTimer is started after drx-SlotOffset from the beginning of the subframe.

Figure 1B:
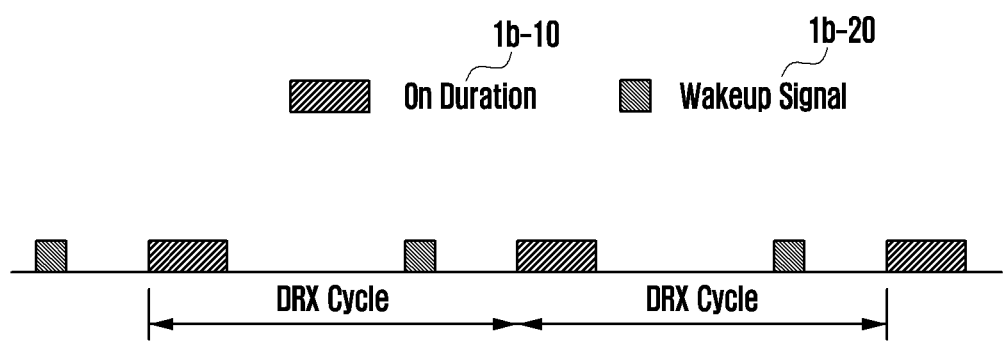
FIG. 1B illustrates an example of an on duration and wake up signal (WUS) according to an embodiment of the disclosure.

FIG. 1B illustrates an example of an on duration and wake up signaling (WUS) in according to an embodiment of the disclosure.

Referring to FIG. 1B, to further enhance UE's power saving, wake up signaling (WUS, 1b-20) is being discussed in Release 16 of NR standards. For a WUS, the UE monitors the PDCCH addressed to power saving radio network temporary identifier (PS-RNTI). PS-RNTI is signaled to the UE by the gNB. The same PS-RNTI can be assigned to several UEs. The UE monitors for the WUS before the start of on-duration. WUS indicates whether the UE needs to wake up to monitor PDCCH during next occurrence of the on-duration.

Search space configuration for the WUS monitoring is indicated by the gNB. The UE monitors nearest PDCCH monitoring occasion before the on-duration or the UE monitors nearest PDCCH monitoring occasion which is at least offset apart from the on-duration (1b-10). The UE assumes that in PDCCH monitoring occasion monitored by the UE for the WUS, PDCCH is transmitted by the gNB according to the activated TCI state (i.e. beam). CORESET configuration associated with a search space includes a list of TCI states. One of the TCI state in TCI state list is activated and indicated to the UE by the gNB. TCI state indicates the DL TX beam (DL TX beam is QCLed with SSB/CSI RS of TCI state) used by the gNB for transmission of PDCCH in the PDCCH monitoring occasions of a search space.

In a cell, the UEs monitoring WUS in a cell can be located in coverage area of different beams. So network has to ensure that WUS monitoring occasion (i.e. PDCCH monitoring occasion (PMO) monitored by the UE for the WUS) for UEs in different beams is different. The UEs in in coverage area of different beams can be allocated different search space configurations such that PMOs configured by each search space configuration do not overlap. The UEs in in coverage area of different beams can be configured with different offset. The UE is in coverage area of different beams can be configured with different starting time of on-duration. The issue is that every time the UE relocates to coverage area of different beam, the gNB needs to perform RRC Reconfiguration. This may lead to significant signaling overhead and additional wakeup time to receive reconfiguration message. A system and method is needed to overcome the issue.

Embodiment 1-1

In one method of this disclosure the UE determines PDCCH monitoring occasion(s) for the WUS as follows:
1. The UE receives the search space configuration for the WUS from the gNB.
   A. A list of search space configurations can be signaled by the gNB. Each search space configuration in the list is uniquely identified by a search space identifier. A search space configuration from this list which the UE should use for the WUS can be explicitly indicated by the gNB. The gNB can indicate this by indicating search space identifier for the WUS or by including in the search space configuration a field which indicates that the DCI format for the WUS can be monitored in that search space configuration. The gNB can indicate multiple search space configurations for the WUS. A list of CORESET configurations is signaled by the gNB. Each CORESET configuration in the list is uniquely identified by a CORESET identifier. CORESET identifier of CORESET configuration for the WUS is indicated in search space configuration for the WUS.
i. The above configuration (list of search space configurations, list of CORESET configurations, and search space identifier for the WUS) can be received by the UE in the RRC message (e.g., RRCReconfiguration message). The configuration can be BWP specific i.e. it is separately signaled for each configured BWPs. The configuration can be provided for all configured BWPs or some of the configured BWPs. The search space identifier for the WUS can be included in PDCCH-configCommon IE. List of search space configurations can be included in PDCCH-config IE. PDCCH-configCommon and PDCCH-config are included in BWP configuration of serving cell. In an embodiment, the search space identifier for the WUS can be indicated to the UE using MAC control element (CE).
B. A search space configuration and CORESET configuration which the UE should use for the WUS can be explicitly indicated by the gNB.
i. This configuration can be received by the UE in the RRC message (e.g., RRCReconfiguration message). The configuration can be BWP specific i.e. it is separately signaled for each configured BWPs. The configuration can be provided for all configured BWPs or some of the configured BWPs. Search space configuration for the WUS can be included in PDCCH-config IE.

If the search space/CORESET configuration to be used for the WUS is BWP specific, the UE shall determine the PDCCH monitoring occasions for the WUS using the active DL BWP's search space/CORESET configuration for the WUS. Here active DL BWP is the active DL BWP of serving cell where the UE monitors the PDCCH for the WUS. If the search space/CORESET configuration to be used for the WUS is BWP specific, the UE monitors for PDCCH for the WUS (or in other words WUS is considered configured) if search space/CORESET configuration to be used for the WUS is signaled for the active BWP. Otherwise, if search space/CORESET configuration to be used for the WUS is no BWP specific, the UE shall determine the PDCCH monitoring occasions for the WUS using the serving cell's search space/CORESET configuration for the WUS wherein the serving cell is the one where the UE monitors the PDCCH for the WUS. In an embodiment serving cell is the SpCell. In an alternate embodiment, search space/CORESET configuration for the WUS is signaled only for serving cell where the UE needs to monitor WUS. So serving cell where the UE monitors the PDCCH for the WUS is the serving cell for which WUS configuration is signaled. In an embodiment wherein multiple DRX groups are configured, the UE monitors WUS only in one serving cell as explained above (e.g., only in SpCell) and this WUS is applied only for non-secondary DRX group or alternately this WUS is applied for both DRX groups. In another embodiment, wherein multiple DRX groups are configured, the UE monitors WUS for different DRX groups in different serving cell. For non-secondary DRX group, the UE monitors WUS in SpCell. For secondary DRX group, the UE monitors WUS in a serving cell signaled by the gNB.

2. The UE receives the RNTI (i.e. PS-RNTI) for the WUS from the gNB.
A. This can be received by the UE in the RRC message (e.g., RRCReconfiguration message). In an embodiment, PS-RNTI is common for all configured BWPs of a serving cell. In an alternate embodiment, PS-RNTI is BWP specific i.e. it is separately signaled for each configured BWPs. The PS-RNTI can be provided for all configured BWPs or some of the configured BWPs.

If the PS-RNTI to be used for the WUS is BWP specific, the UE shall use the PS-RNTI in the active DL BWP's configuration. Here active DL BWP is the active DL BWP of serving cell where the UE monitors the PDCCH for the WUS. Otherwise, the UE shall use PS-RNTI of serving cell wherein the serving cell is the one where the UE monitors the PDCCH for the WUS. In an embodiment serving cell is the SpCell. In an alternate embodiment, PS-RNTI for the WUS is signaled only for serving cell where the UE needs to monitor WUS. So serving cell where the UE monitors the PDCCH for the WUS is the serving cell for which WUS configuration is signaled.

3. The UE receives the offset for the WUS from the gNB.
A. This can be received by the UE in the RRC message (e.g., RRCReconfiguration message). In an embodiment, offset is common for all configured BWPs of a serving cell. In an alternate embodiment, offset is BWP specific i.e. it is separately signaled for each configured BWPs. The offset can be provided for all configured BWPs or some of the configured BWPs.

If the offset to be used for the WUS is BWP specific, the UE shall use the offset in the active DL BWP's configuration. Here active DL BWP is the active DL BWP of serving cell where the UE monitors the PDCCH for the WUS. Otherwise, the UE shall use offset of serving cell wherein the serving cell is the one where the UE monitors the PDCCH for the WUS. In an embodiment serving cell is the SpCell. In an alternate embodiment, offset for the WUS is signaled only for serving cell where the UE needs to monitor WUS. So serving cell where the UE monitors the PDCCH for the WUS is the serving cell for which WUS configuration is signaled.

In an embodiment, offset indicates the time where the UE starts monitoring PDCCH for detection WUS before the on duration. The UE monitors the PDCCH monitoring occasions in the slot(s) indicated by duration field of search space configuration for the WUS.

4. Alternately, amongst the PDCCH monitoring occasions configured by the search space for the WUS, nearest 'N' PDCCH monitoring occasions which are at least 'offset' away before the on-duration are sequentially numbered.
A. The numbering can start from 1st PDCCH monitoring occasion which is at least 'offset' away from the on-duration to the Nth PDCCH monitoring occasion which is at least 'offset' away from the on-duration. Alternately, the numbering can start from Nth PDCCH monitoring occasion which is at least 'offset' away from the on-duration to the 1st PDCCH monitoring occasion which is at least 'offset' away from the on-duration.
B. It is to be noted that depending on search space configuration parameters, these 'N' PDCCH monitoring occasions can be in one slot or multiple slots (consecutive or non-consecutive).
C. In an embodiment, 'N' is the total number of TCI states in TCI state list of CORESET or CORESET configuration of WUS.
D. In an alternate embodiment, 'N' configured where 'N'<=total number of TCI states in TCI state list.

E. In an embodiment, in a time division duplex (TDD) cell, amongst the PDCCH monitoring occasions configured by the search space for the WUS, the PDCCH monitoring occasions which overlap with UL symbols are excluded i.e. considered as invalid. The remaining PDCCH monitoring occasions are considered as valid. Amongst the PDCCH monitoring occasions configured by the search space for the WUS, nearest 'N' PDCCH monitoring occasions which are not overlapping with UL symbols and which are at least offset' away before the on-duration are sequentially numbered. In other words, amongst the valid PDCCH monitoring occasions configured by the search space for the WUS, nearest 'N' PDCCH monitoring occasions which are at least 'offset' away before the on-duration are sequentially numbered.
   i. In an embodiment, the UL symbols are determined according to tdd-UL-DL-ConfigurationCommon IE received from the gNB (e.g., in SIB1).

F. In an embodiment, in a TDD cell, amongst the PDCCH monitoring occasions configured by the search space for the WUS, the PDCCH monitoring occasions which overlap with UL symbols or Flexible symbols are excluded i.e. considered as invalid. The remaining PDCCH monitoring occasions are considered as valid. Amongst the PDCCH monitoring occasions configured by the search space for the WUS, nearest 'N' PDCCH monitoring occasions which are not overlapping with UL symbols or flexible symbols and which are at least offset' away before the on-duration are sequentially numbered. In other words, amongst the valid PDCCH monitoring occasions configured by the search space for the WUS, nearest 'N' PDCCH monitoring occasions which are at least 'offset' away before the on-duration are sequentially numbered.
   i. In an embodiment, the UL symbols and flexible symbols are determined according to tdd-UL-DL-ConfigurationCommon IE received from the gNB (e.g., in SIB1).

Alternately, if on duration starts in slot 'X', between slot X-offset to slot X−1, in the first Ts slot(s) indicated by duration field of search space configuration f for the WUS or in the $T_s=1$ slot if duration is not provided, the PDCCH monitoring occasions are sequentially numbered.

Alternately, if on duration starts in slot 'X', starting from slot X-offset the valid PDCCH monitoring occasions for the WUS before the on duration are sequentially numbered.

5. If i-th TCI state is active in TCI state list of CORSET or CORESET configuration of WUS, the UE monitors the i-th PDCCH monitoring occasion for the WUS (i.e. i-th PDCCH monitoring occasion amongst the numbered PDCCH monitoring occasions in Operation 4) where i=1, 2, . . . N. The activated TCI state is signaled to the UE by the gNB using MAC CE.
   A. CORESET configuration associated with a search space includes a list of TCI states. One of the TCI state in TCI state list is activated and indicated to the UE by the gNB. TCI state indicates the DL TX beam (DL TX beam is QCLed with SSB/CSI-RS of TCI state) used by the gNB for transmission of PDCCH.

Figure 1C:
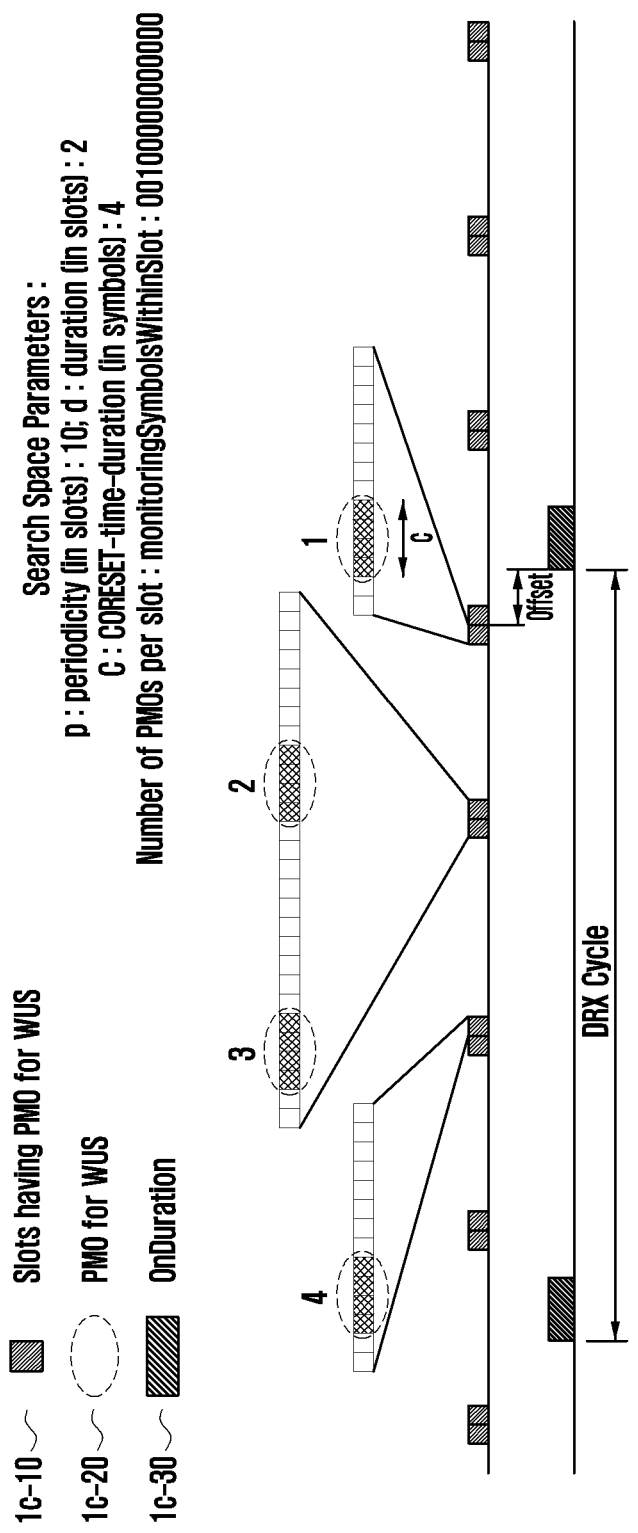
FIG. 1C illustrates an example of determining physical downlink control channel (PDCCH) monitoring occasion for wake up signal (WUS) according to an embodiment of the disclosure.

FIG. 1C illustrates an example of determining physical downlink control channel (PDCCH) monitoring occasion for the WUS in according to an embodiment of the disclosure.

Referring to FIG. 1C, in the embodiment 1-1, there are 4 TCI states in the TCI state list. There is one PDCCH monitoring occasion in a slot and 2 consecutive slots having PDCCH monitoring occasion for the WUS occurs every 10 slots (1c-10). So, nearest 4 PDCCH monitoring occasions (1c-20) which are at least 'offset' away before the on-duration (1c-30) are sequentially numbered. If the 1st TCI state in TCI state list is active, the UE monitors the PDCCH monitoring occasion number 1 (1c-20). If the 2nd TCI state in TCI state list is active, the UE monitors the PDCCH monitoring occasion number 2 (1c-20). If the 3rd TCI state in TCI state list is active, the UE monitors the PDCCH monitoring occasion number 3 (1c-20). If the 4th TCI state in TCI state list is active, UE monitors the PDCCH monitoring occasion number 4 (1c-20). The UE performs this operation before every on-duration.

Embodiment 1-2

In one method of this disclosure the UE determines PDCCH monitoring occasion for the WUS as follows:

1. The UE receives the search space configuration for the WUS from the gNB.
   A. A list of search space configurations can be signaled by the gNB. Each search space configuration in the list is uniquely identified by a search space identifier. A search space configuration from this list which the UE should use for the WUS can be explicitly indicated by the gNB. The gNB can indicate this by indicating search space identifier for the WUS or by including in the search space configuration a field which indicates that the DCI format for the WUS can be monitored in that search space configuration. The gNB can indicate multiple search space configurations for the WUS. A list of CORESET configurations is signaled by the gNB. Each CORESET configuration in the list is uniquely identified by a CORESET identifier. CORESET identifier of CORESET configuration for the WUS is indicated in search space configuration for the WUS.
      i. The above configuration (list of search space configurations, list of CORESET configurations, and search space identifier for the WUS) can be received by the UE in the RRC message (e.g., RRCReconfiguration message). The configuration can be BWP specific i.e. it is separately signaled for each configured BWPs. The configuration can be provided for all configured BWPs or some of the configured BWPs. The search space identifier for the WUS can be included in PDCCH-configCommon IE. In an embodiment, the search space identifier for the WUS can be indicated to the UE using MAC CE. List of search space configurations can be included in PDCCH-config IE. PDCCH-configCommon and PDCCH-config are included in BWP configuration of serving cell.
   B. A search space configuration and CORESET configuration which the UE should use for the WUS can be explicitly indicated by the gNB.
      i. This configuration can be received by the UE in the RRC message (e.g., RRCReconfiguration message). The configuration can be BWP specific i.e. it is separately signaled for each configured BWPs. The configuration can be provided for all configured BWPs or some of the configured BWPs. Search space configuration for the WUS can be included in PDCCH-config IE.

If the search space/CORESET configuration to be used for the WUS is BWP specific, the UE shall determine the PDCCH monitoring occasions for the WUS using the active DL BWP's search space/CORESET configuration for the WUS. Here active DL BWP is the active DL BWP of serving cell where the UE monitors the PDCCH for the WUS. If the search space/CORESET configuration to be used for the WUS is BWP specific, the UE monitors for PDCCH for the WUS (or in other words WUS is considered configured) if search space/CORESET configuration to be used for the WUS is signaled for the active BWP. Otherwise, if the search space/CORESET configuration to be used for the WUS is not BWP specific, the UE shall determine the PDCCH monitoring occasions for the WUS using the serving cell's search space/CORESET configuration for the WUS wherein the serving cell is the one where the UE monitors the PDCCH for the WUS. In an embodiment serving cell is the SpCell. In an alternate embodiment, search space/CORESET configuration for the WUS is signaled only for serving cell where the UE needs to monitor WUS. So serving cell where the UE monitors the PDCCH for the WUS is the serving cell for which WUS configuration is signaled. In an embodiment wherein multiple DRX groups are configured, the UE monitors WUS only in one serving cell as explained above (e.g., only in SpCell) and this WUS is applied only for non-secondary DRX group or alternately this WUS is applied for both DRX groups. In another embodiment, wherein multiple DRX groups are configured, the UE monitors WUS for different DRX groups in different serving cell. For non-secondary DRX group, the UE monitors WUS in SpCell. For secondary DRX group, the UE monitors WUS in a serving cell signaled by the gNB.

2. The UE receives the RNTI (i.e. PS-RNTI) for the WUS from the gNB.

This can be received by the UE in the RRC message (e.g., RRCReconfiguration message). In an embodiment, PS-RNTI is common for all configured BWPs of a serving cell. In an alternate embodiment, PS-RNTI is BWP specific i.e. it is separately signaled for each configured BWPs. The PS-RNTI can be provided for all configured BWPs or some of the configured BWPs.

A. If the PS-RNTI to be used for the WUS is BWP specific, the UE shall use the PS-RNTI in the active DL BWP's configuration. Here active DL BWP is the active DL BWP of serving cell where the UE monitors the PDCCH for the WUS. Otherwise, the UE shall use PS-RNTI of serving cell wherein the serving cell is the one where the UE monitors the PDCCH for the WUS. In an embodiment serving cell is the SpCell. In an alternate embodiment, PS-RNTI for the WUS is signaled only for serving cell where the UE needs to monitor WUS. So serving cell where the UE monitors the PDCCH for the WUS is the serving cell for which WUS configuration is signaled.

3. Amongst the PDCCH monitoring occasions configured by the search space for the WUS, nearest 'N' PDCCH monitoring occasions before the on-duration are sequentially numbered.

A. The numbering can start from 1st PDCCH monitoring occasion before the on-duration to the Nth PDCCH monitoring occasion before the on-duration. Alternately, the numbering can start from Nth PDCCH monitoring occasion before the on-duration to the 1st PDCCH monitoring occasion before the on-duration.

B. It is to be noted that depending on search space configuration parameters, these 'N' PDCCH monitoring occasions can be in one slot or multiple slots (consecutive or non-consecutive).

C. In an embodiment, 'N' is the total number of TCI states in TCI state list of CORESET or CORESET configuration of WUS.

D. In an alternate embodiment, 'N' configured where 'N'<=total number of TCI states in TCI state list.

E. In an embodiment, in a TDD cell, amongst the PDCCH monitoring occasions configured by the search space for the WUS, the PDCCH monitoring occasions which overlap with UL symbols are excluded i.e. considered as invalid. The remaining PDCCH monitoring occasions are considered as valid. Amongst the PDCCH monitoring occasions configured by the search space for the WUS, nearest 'N' PDCCH monitoring occasions which are not overlapping with UL symbols, before the on-duration are sequentially numbered. In other words, amongst the valid PDCCH monitoring occasions configured by the search space for the WUS, nearest 'N' PDCCH monitoring occasions before the on-duration are sequentially numbered.

i. In an embodiment, the UL symbols are determined according to tdd-UL-DL-ConfigurationCommon IE received from the gNB (e.g., in SIB1).

F. In an embodiment, in a TDD cell, amongst the PDCCH monitoring occasions configured by the search space for the WUS, the PDCCH monitoring occasions which overlap with UL symbols or Flexible symbols are excluded i.e. considered as invalid. The remaining PDCCH monitoring occasions are considered as valid. Amongst the PDCCH monitoring occasions configured by the search space for the WUS, nearest 'N' PDCCH monitoring occasions which are not overlapping with UL symbols or flexible symbols, before the on-duration are sequentially numbered. In other words, amongst the valid PDCCH monitoring occasions configured by the search space for the WUS, nearest 'N' PDCCH monitoring occasions before the on-duration are sequentially numbered.

i. In an embodiment, the UL symbols and flexible symbols are determined according to tdd-UL-DL-ConfigurationCommon IE received from the gNB (e.g., in SIB1).

4. If i-th TCI state is active in TCI state list of CORESET or CORESET configuration of WUS, the UE monitors the i-th PDCCH monitoring occasion for the WUS (i.e. i-th PDCCH monitoring occasion amongst the numbered PDCCH monitoring occasions in Operation 3) where i=1, 2, . . . N. The activated TCI state is signaled to the UE by the gNB using MAC CE.

A. CORESET configuration associated with a search space includes a list of TCI states. One of the TCI state in TCI state list is activated and indicated to the UE by the gNB. TCI state indicates the DL TX beam (DL TX beam is QCLed with SSB/CSI RS of TCI state) used by the gNB for transmission of PDCCH.

Figure 1D:
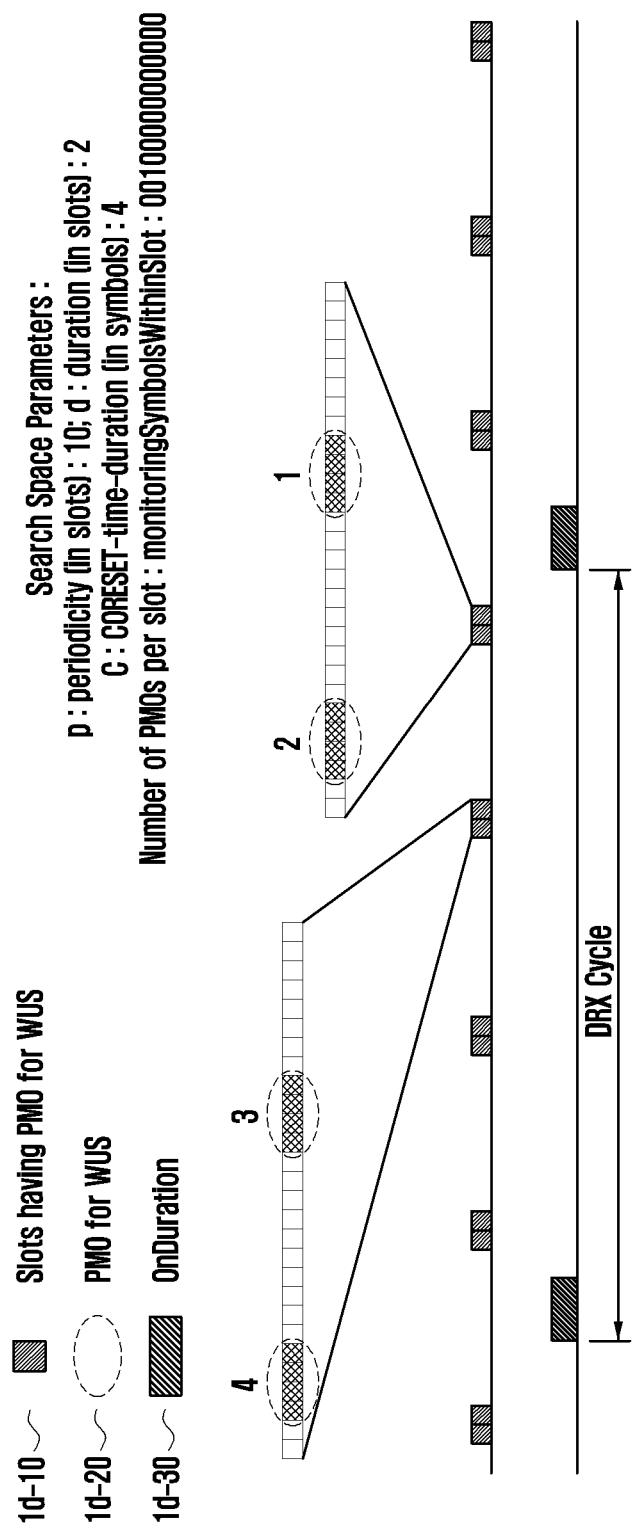
FIG. 1D illustrates another example of determining PDCCH monitoring occasion for a WUS according to an embodiment of the disclosure.

FIG. 1D illustrates another example of determining PDCCH monitoring occasion for the WUS in according to an embodiment of the disclosure.

Referring to FIG. 1D, in the embodiment 1-2, there are 4 TCI states in the TCI state list. There is one PDCCH monitoring occasion in a slot and 2 consecutive slots having PDCCH monitoring occasion for the WUS occurs every 10 slots (1d-10). So, nearest 4 PDCCH monitoring occasions (1d-20) before the on-duration (1d-30) are sequentially numbered. If the 1st TCI state in TCI state list is active, the UE monitors the PDCCH monitoring occasion number 1 (1d-20). If the 2nd TCI state in TCI state list is active, the UE monitors the PDCCH monitoring occasion number 2 (1d-20). If the 3rd TCI state in TCI state list is active, the UE monitors the PDCCH monitoring occasion number 3 (1d-20). If the 4th TCI state in TCI state list is active, the UE monitors the PDCCH monitoring occasion number 4 (1d-20). The UE performs this operation before every on-duration.

Embodiment 1-3

In one method of this disclosure the UE determines PDCCH monitoring occasion for the WUS as follows:
1. The UE receives the search space configuration for the WUS from the gNB.
   A. A list of search space configurations can be signaled by the gNB. Each search space configuration in the list is uniquely identified by a search space identifier. A search space configuration from this list which the UE should use for the WUS can be explicitly indicated by the gNB. The gNB can indicate this by indicating search space identifier for the WUS or by including in the search space configuration a field which indicates that the DCI format for the WUS can be monitored in that search space configuration. The gNB can indicate multiple search space configurations for the WUS. A list of CORESET configurations is signaled by the gNB. Each CORESET configuration in the list is uniquely identified by a CORESET identifier. CORESET identifier of CORESET configuration for the WUS is indicated in search space configuration for the WUS.
      i. The above configuration (list of search space configurations, list of CORESET configurations, and search space identifier for the WUS) can be received by the UE in the RRC message (e.g., RRCReconfiguration message). The configuration can be BWP specific i.e. it is separately signaled for each configured BWPs. The configuration can be provided for all configured BWPs or some of the configured BWPs. The search space identifier for the WUS can be included in PDCCH-configCommon IE. In an embodiment, the search space identifier for the WUS can be indicated to the UE using MAC CE. List of search space configurations can be included in PDCCH-config IE. PDCCH-configCommon and PDCCH-config are included in BWP configuration of serving cell.
   B. A search space configuration and CORESET configuration which the UE should use for the WUS can be explicitly indicated by the gNB.
      i. This configuration can be received by the UE in the RRC message (e.g., RRCReconfiguration message). The configuration can be BWP specific i.e. it is separately signaled for each configured BWPs. The configuration can be provided for all configured BWPs or some of the configured BWPs. Search space configuration for the WUS can be included in PDCCH-config IE.

If the search space/CORESET configuration to be used for the WUS is BWP specific, the UE shall determine the PDCCH monitoring occasions for the WUS using the active DL BWP's search space/CORESET configuration for the WUS. Here active DL BWP is the active DL BWP of serving cell where the UE monitors the PDCCH for the WUS. If the search space/CORESET configuration to be used for the WUS is BWP specific, the UE monitors for PDCCH for the WUS (or in other words WUS is considered configured) if search space/CORESET configuration to be used for the WUS is signaled for the active BWP. Otherwise, if the search space/CORESET configuration to be used for the WUS is not BWP specific, the UE shall determine the PDCCH monitoring occasions for the WUS using the serving cell's search space/CORESET configuration for the WUS wherein the serving cell is the one where the UE monitors the PDCCH for the WUS. In an embodiment serving cell is the SpCell. In an alternate embodiment, search space/CORESET configuration for the WUS is signaled only for serving cell where the UE needs to monitor WUS. So serving cell where the UE monitors the PDCCH for the WUS is the serving cell for which WUS configuration is signaled. In an embodiment wherein multiple DRX groups are configured, the UE monitors WUS only in one serving cell as explained above (e.g., only in SpCell) and this WUS is applied only for non-secondary DRX group or alternately this WUS is applied for both DRX groups. In another embodiment, wherein multiple DRX groups are configured, the UE monitors WUS for different DRX groups in different serving cell. For non-secondary DRX group, the UE monitors WUS in SpCell. For secondary DRX group, the UE monitors WUS in a serving cell signaled by the gNB.

2. The UE receives the RNTI (i.e. PS-RNTI) for the WUS from the gNB.
   A. This can be received by the UE in the RRC message (e.g., RRCReconfiguration message). In an embodiment, PS-RNTI is common for all configured BWPs of a serving cell. In an alternate embodiment, PS-RNTI is BWP specific i.e. it is separately signaled for each configured BWPs. The PS-RNTI can be provided for all configured BWPs or some of the configured BWPs.

If the PS-RNTI to be used for the WUS is BWP specific, the UE shall use the PS-RNTI in the active DL BWP's configuration. Here active DL BWP is the active DL BWP of serving cell where the UE monitors the PDCCH for the WUS. Otherwise, the UE shall use PS-RNTI of serving cell wherein the serving cell is the one where the UE monitors the PDCCH for the WUS. In an embodiment serving cell is the SpCell. In an alternate embodiment, PS-RNTI for the WUS is signaled only for serving cell where the UE needs to monitor WUS. So serving cell where the UE monitors the PDCCH for the WUS is the serving cell for which WUS configuration is signaled.

3. The UE receives the offset for the WUS from the gNB.
   A. This can be received by the UE in the RRC message (e.g., RRCReconfiguration message). In an embodiment, offset is common for all configured BWPs of a serving cell. In an alternate embodiment, offset is BWP specific i.e. it is separately signaled for each configured BWPs. The offset can be provided for all configured BWPs or some of the configured BWPs.

If the offset to be used for the WUS is BWP specific, the UE shall use the offset in the active DL BWP's configuration. Here active DL BWP is the active DL BWP of serving cell where the UE monitors the PDCCH for the WUS. Otherwise, UE shall use offset of serving cell wherein the serving cell is the one where the UE monitors the PDCCH for the WUS. In an embodiment serving cell is the SpCell. In an alternate embodiment, offset for the WUS is signaled only for serving cell where the UE needs to monitor WUS. So serving cell where the UE monitors the PDCCH for the WUS is the serving cell for which WUS configuration is signaled.

4. The UE receives the length of WUS monitoring window from the gNB.
   A. The length can be in slots. Duration of slot is determined based on SCS.
   B. This can be received by the UE in the RRC message (e.g., RRCReconfiguration message). In an embodiment, length of WUS monitoring window is common for all configured BWPs of a serving cell. In an alternate embodiment, length of WUS monitoring window is BWP specific i.e. it is separately signaled for each configured BWPs. The length of WUS monitoring window can be provided for all configured BWPs or some of the configured BWPs.

5. Amongst the PDCCH monitoring occasions configured by the search space for the WUS, PDCCH monitoring occasions in WUS monitoring window are sequentially numbered. WUS monitoring window starts at 'offset+monitoring window length' from the on-duration. WUS monitoring window ends at an offset from the on-duration. Alternately, WUS monitoring window starts at offset from the on-duration. The WUS monitoring window ends at least 'p' slots before the start of on duration. 'p' can also be signaled by the gNB. Alternately, WUS monitoring window occurs between slot "X" and "X-offset' where X is slot in which on duration starts, WUS monitoring window is first Ts slots given by the duration field of search space configuration for the WUS.

A. In an embodiment, in a TDD cell, amongst the PDCCH monitoring occasions configured by the search space for the WUS, the PDCCH monitoring occasions which overlap with UL symbols are excluded i.e. considered as invalid. The remaining PDCCH monitoring occasions are considered as valid. Amongst the PDCCH monitoring occasions configured by the search space for the WUS, in the WUS monitoring window, PDCCH monitoring occasions which are not overlapping with UL symbols are sequentially numbered. In other words, in the WUS monitoring window valid PDCCH monitoring occasions for the WUS are sequentially numbered.

i. In an embodiment, the UL symbols are determined according to tdd-UL-DL-ConfigurationCommon IE received from the gNB (e.g., in SIB1).

B. In an embodiment, in a TDD cell, amongst the PDCCH monitoring occasions configured by the search space for the WUS, the PDCCH monitoring occasions which overlap with UL symbols or Flexible symbols are excluded i.e. considered as invalid. The remaining PDCCH monitoring occasions are considered as valid. In the WUS monitoring window, PDCCH monitoring occasions configured by the search space for the WUS which are not overlapping with UL symbols or flexible symbols are sequentially numbered. In other words, in the WUS monitoring window valid PDCCH monitoring occasions for the WUS, are sequentially numbered.

i. In an embodiment, the UL symbols and flexible symbols are determined according to tdd-UL-DL-ConfigurationCommon IE received from the gNB (e.g., in SIB1).

6. In an embodiment, if i-th TCI state is active in TCI state list of CORESET or CORESET configuration of WUS, the UE monitors the ith PDCCH monitoring occasion for the WUS (i.e. i-th PDCCH monitoring occasion amongst the numbered PDCCH monitoring occasions in Operation 4) where i=1, 2, . . . N. Alternately, if i-th TCI state is active in TCI state list of CORESET or CORESET configuration of WUS, the UE monitors the k-th PDCCH monitoring occasion for the WUS in WUS monitoring window, where k mod N=i; 'N' is the total number of TCI states in TCI state list of CORESET or CORESET configuration of WUS. Alternately, the [x×N+K]th PDCCH monitoring occasion (s) for the WUS in WUS monitoring window corresponds to the K-th TCI state, where x=0, 1, . . . X−1, K=1, 2, . . . N, N is the number of TCI states in TCI state list and X is equal to CEIL(number of PDCCH monitoring occasions in monitoring window/N). Here, the CEIL(x) represents the least integer greater than or equal to x.

A. CORESET configuration associated with a search space includes a list of TCI states. One of the TCI state in TCI state list is activated and indicated to the UE by the gNB. TCI state indicates the DL TX beam (DL TX beam is QCLed with SSB/CSI RS of TCI state) used by the gNB for transmission of PDCCH.

Figure 1E:
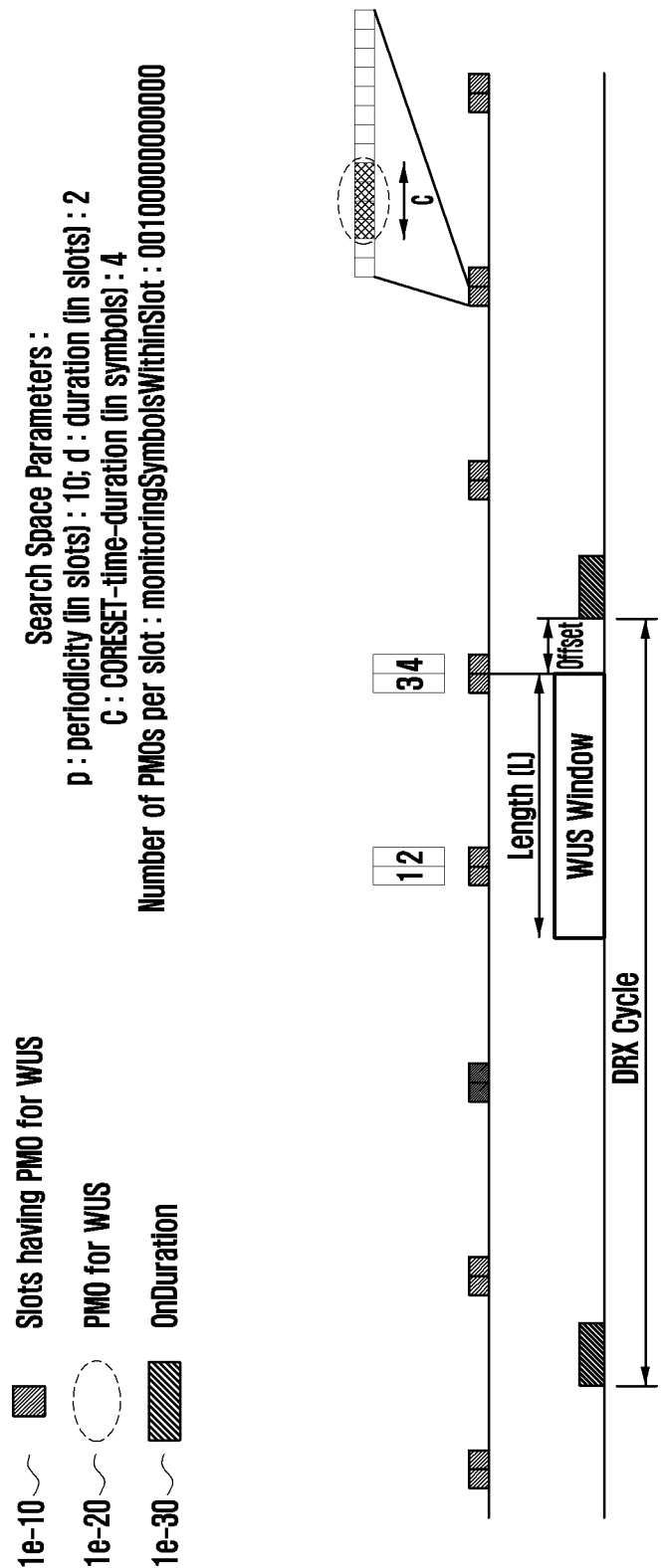
FIG. 1E illustrates another example of determining PDCCH monitoring occasion for a WUS in according to an embodiment of the disclosure.

FIG. 1E illustrates another example of determining PDCCH monitoring occasion for the WUS in according to an embodiment of the disclosure.

Referring to FIG. 1E, there are 4 PDCCH monitoring occasions for the WUS (1e-20) in WUS monitoring window and these are sequentially numbered from 1 to 4. If the 1st TCI state in TCI state list is active, the UE monitors the PDCCH monitoring occasion number 1 (1e-10). If the 2nd TCI state in TCI state list is active, the UE monitors the PDCCH monitoring occasion number 2 (1e-10). If the 3rd TCI state in TCI state list is active, the UE monitors the PDCCH monitoring occasion number 3 (1e-10). If the 4th TCI state in TCI state list is active, the UE monitors the PDCCH monitoring occasion number 4 (1e-10). The UE performs this operation before every on-duration.

In an embodiment 1-3 in this disclosure, parameter 'offset' is not configured by the gNB. WUS monitoring window starts from the first/nearest PDCCH monitoring occasion for the WUS (i.e. PDCCH monitoring occasion configured by search space for the WUS or valid PDCCH monitoring occasion from PDCCH monitoring occasions configured by search space for the WUS as explained earlier) before the on duration (1e-30). Alternately, WUS monitoring window starts from the slot which includes the first/nearest PDCCH monitoring occasion for the WUS before the on duration (1e-30).

Embodiment 1-4

In one method of this disclosure the UE determines PDCCH monitoring occasion for the WUS as follows:

1. The UE receives the search space configuration for the WUS from the gNB.

A. A list of search space configurations can be signaled by the gNB. Each search space configuration in the list is uniquely identified by a search space identifier. A search space configuration from this list which the UE should use for the WUS can be explicitly indicated by the gNB. The gNB can indicate this by indicating search space identifier for the WUS or by including in the search space configuration a field which indicates that the DCI format for the WUS can be monitored in that search space configuration. The gNB can indicate multiple search space configurations for the WUS. A list of CORESET configurations is signaled by the gNB. Each CORESET configuration in the list is uniquely identified by a CORESET identifier. CORESET identifier of CORESET configuration for the WUS is indicated in search space configuration for the WUS.

i. The above configuration (list of search space configurations, list of CORESET configurations, and search space identifier for the WUS) can be received by the UE in the RRC message (e.g., RRCReconfiguration message). The configuration can be BWP specific i.e. it is separately signaled for each configured BWPs. The configuration can be provided for all configured BWPs or some of the configured BWPs. The search space identifier for the WUS can be included in PDCCH-configCommon IE. In an embodiment, the search space identifier for the WUS can be indicated to the UE using MAC CE. List of search space configurations can be included in PDCCH-config IE. PDCCH-configCommon and PDCCH-config are included in BWP configuration of serving cell.

B. A search space configuration and CORESET configuration which the UE should use for the WUS can be explicitly indicated by the gNB.
  i. This configuration can be received by the UE in the RRC message (e.g., RRCReconfiguration message). The configuration can be BWP specific i.e. it is separately signaled for each configured BWPs. The configuration can be provided for all configured BWPs or some of the configured BWPs. Search space configuration for the WUS can be included in PDCCH-config IE.

If the search space/CORESET configuration to be used for the WUS is BWP specific, the UE shall determine the PDCCH monitoring occasions for the WUS using the active DL BWP's search space/CORESET configuration for the WUS. Here active DL BWP is the active DL BWP of serving cell where the UE monitors the PDCCH for the WUS. If the search space/CORESET configuration to be used for the WUS is BWP specific, the UE monitors for PDCCH for the WUS (or in other words WUS is considered configured) if search space/CORESET configuration to be used for the WUS is signaled for the active BWP. Otherwise, if the search space/CORESET configuration to be used for the WUS is not BWP specific, the UE shall determine the PDCCH monitoring occasions for the WUS using the serving cell's search space/CORESET configuration for the WUS wherein the serving cell is the one where the UE monitors the PDCCH for the WUS. In an embodiment serving cell is the SpCell. In an alternate embodiment, search space/CORESET configuration for the WUS is signaled only for serving cell where the UE needs to monitor WUS. So serving cell where the UE monitors the PDCCH for the WUS is the serving cell for which WUS configuration is signaled.

2. The UE receives the RNTI (i.e. PS-RNTI) for the WUS from the gNB.
  A. This can be received by the UE in the RRC message (e.g., RRCReconfiguration message). In an embodiment, PS-RNTI is common for all configured BWPs of a serving cell. In an alternate embodiment, PS-RNTI is BWP specific i.e. it is separately signaled for each configured BWPs. The PS-RNTI can be provided for all configured BWPs or some of the configured BWPs.

If the PS-RNTI to be used for the WUS is BWP specific, the UE shall use the PS-RNTI in the active DL BWP's configuration. Here active DL BWP is the active DL BWP of serving cell where the UE monitors the PDCCH for the WUS. Otherwise, the UE shall use PS-RNTI of serving cell wherein the serving cell is the one where the UE monitors the PDCCH for the WUS. In an embodiment serving cell is the SpCell. In an alternate embodiment, PS-RNTI for the WUS is signaled only for serving cell where the UE needs to monitor WUS. So serving cell where the UE monitors the PDCCH for the WUS is the serving cell for which WUS configuration is signaled. In an embodiment wherein multiple DRX groups are configured, UE monitors WUS only in one serving cell as explained above (e.g., only in SpCell) and this WUS is applied only for non-secondary DRX group or alternately this WUS is applied for both DRX groups. In another embodiment, wherein multiple DRX groups are configured, the UE monitors WUS for different DRX groups in different serving cell. For non-secondary DRX group, the UE monitors WUS in SpCell. For secondary DRX group, the UE monitors WUS in a serving cell signaled by the gNB.

3. The UE receives a list of one or more offsets for the WUS from the gNB.
  A. This can be received by the UE in the RRC message (e.g., RRCReconfiguration message). In an embodiment, list is common for all configured BWPs of a serving cell. In an alternate embodiment, list is BWP specific i.e. it is separately signaled for each configured BWPs. The list can be provided for all configured BWPs or some of the configured BWPs.

If the list of offset to be used for the WUS is BWP specific, the UE shall use the list of offset in the active DL BWP's configuration. Here active DL BWP is the active DL BWP of serving cell where the UE monitors the PDCCH for the WUS. Otherwise, the UE shall use list of offset of serving cell wherein the serving cell is the one where the UE monitors the PDCCH for the WUS. In an embodiment serving cell is the SpCell. In an alternate embodiment, list of offset for the WUS is signaled only for serving cell where the UE needs to monitor WUS. So serving cell where the UE monitors the PDCCH for the WUS is the serving cell for which WUS configuration is signaled.

In an embodiment, instead of list of offset, offset can be indicated for each TCI state in TCI state list.

4. Amongst the PDCCH monitoring occasions configured by the search space for the WUS, nearest 'N' PDCCH monitoring occasions which are at least 'offset' away before the on-duration are sequentially numbered.
  A. The numbering can start from 1st PDCCH monitoring occasion which is at least 'offset' away from the on-duration to the Nth PDCCH monitoring occasion which is at least 'offset' away from the on-duration. Alternately, the numbering can start from Nth PDCCH monitoring occasion which is at least 'offset' away from the on-duration to the 1st PDCCH monitoring occasion which is at least 'offset' away from the on-duration.
  B. It is to be noted that depending on search space configuration parameters, these 'N' PDCCH monitoring occasions can be in one slot or multiple slots (consecutive or non-consecutive).
  C. In an embodiment, 'N' is the total number of TCI states in TCI state list of CORESET or CORESET configuration of WUS.
  D. In an alternate embodiment, 'N' configured where 'N'<=total number of TCI states in TCI state list.
  E. In an embodiment, in a TDD cell, amongst the PDCCH monitoring occasions configured by the search space for the WUS, the PDCCH monitoring occasions which overlap with UL symbols are excluded i.e. considered as invalid. The remaining PDCCH monitoring occasions are considered as valid. Amongst the PDCCH monitoring occasions configured by the search space for the WUS, nearest 'N' PDCCH monitoring occasions which are not overlapping with UL symbols and which are at least offset' away before the on-duration are sequentially numbered. In other words, amongst the valid PDCCH monitoring occasions configured by the search space for the WUS, nearest 'N' PDCCH monitoring occasions which are at least 'offset' away before the on-duration are sequentially numbered.
    i. In an embodiment, the UL symbols are determined according to tdd-UL-DL-ConfigurationCommon IE received from the gNB (e.g., in SIB1).

F. In an embodiment, in a TDD cell, amongst the PDCCH monitoring occasions configured by the search space for the WUS, the PDCCH monitoring occasions which overlap with UL symbols or Flexible symbols are excluded i.e. considered as invalid. The remaining PDCCH monitoring occasions are considered as valid. Amongst the PDCCH monitoring occasions configured by the search space for the WUS, nearest 'N' PDCCH monitoring occasions which are not overlapping with UL symbols or flexible symbols and which are at least offset' away before the on-duration are sequentially numbered. In other words, amongst the valid PDCCH monitoring occasions configured by the search space for the WUS, nearest 'N' PDCCH monitoring occasions which are at least 'offset' away before the on-duration are sequentially numbered.
   i. In an embodiment, the UL symbols and flexible symbols are determined according to tdd-UL-DL-ConfigurationCommon IE received from the gNB (e.g., in SIB1).
5. If i-th TCI state is active in TCI state list of CORESET or CORESET configuration of WUS, the UE monitors nearest PDCCH monitoring occasion for the WUS which is at least i-th offset before the on duration. Here i-th offset refers to i-th offset in list of offset received from the gNB. In an embodiment i-th offset refers to offset corresponding to the i-th TCI state.
   A. CORESET configuration associated with a search space includes a list of TCI states. One of the TCI state in TCI state list is activated and indicated to the UE by the gNB. TCI state indicates the DL TX beam (DL TX beam is QCLed with SSB/CSI RS of TCI state) used by the gNB for transmission of PDCCH.

Figure 1F:
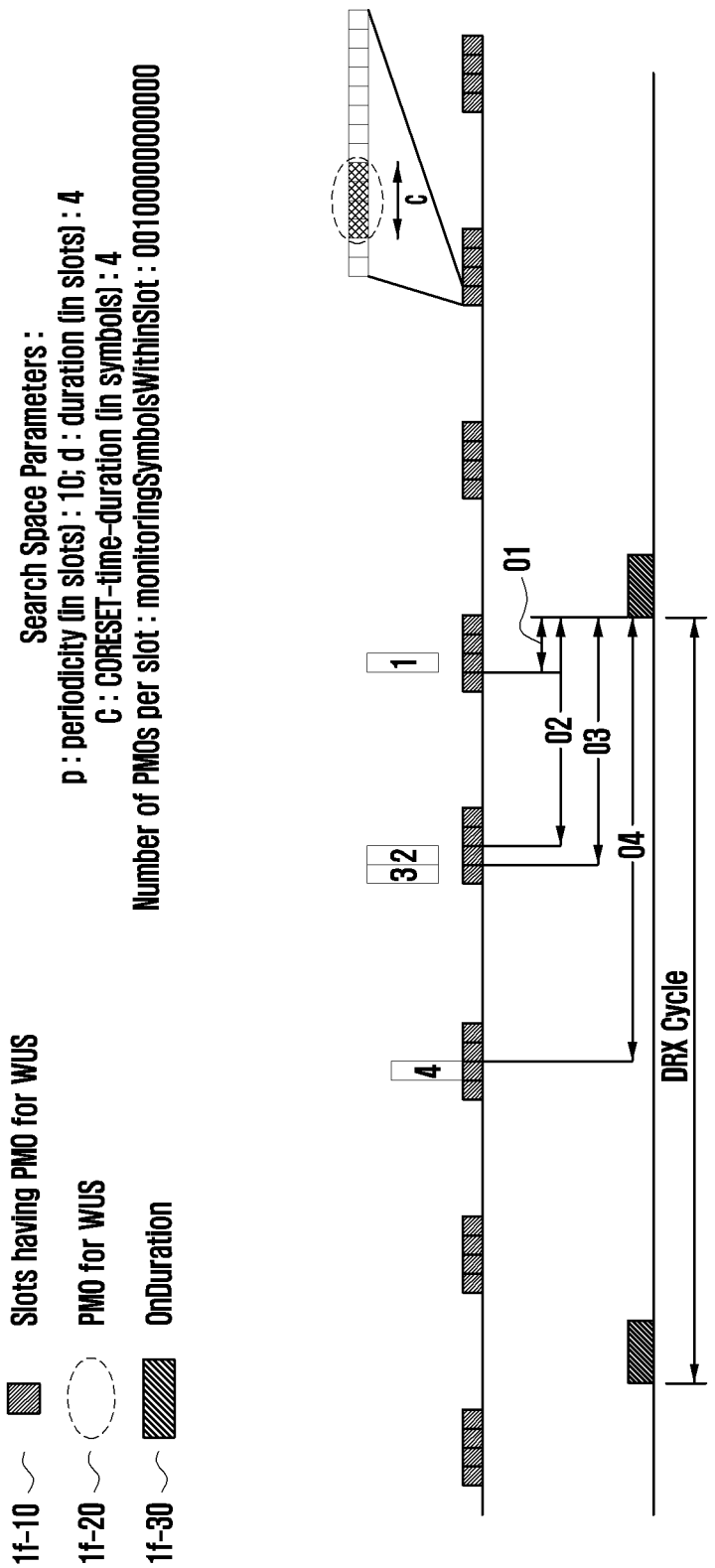
FIG. 1F illustrates another example of determining PDCCH monitoring occasion for a WUS in according to an embodiment of the disclosure.

FIG. 1F illustrates another example of determining PDCCH monitoring occasion for the WUS in according to an embodiment of the disclosure. Referring to FIG. 1F, in this embodiment 1-4, there are 4 TCI states in the TCI state list. The gNB signals 4 offsets to the UE, one corresponding to each TCI state. If the 1st TCI state in TCI state list is active, the UE monitors the nearest PDCCH monitoring occasion (**1*f*-10) which is at least offset O1 before the on duration (1*f*-30). If the 2nd TCI state in TCI state list is active, the UE monitors the nearest PDCCH monitoring occasion (1*f*-10) which is at least offset O3 before the on duration (1*f*-30). If the 3rd TCI state in TCI state list is active, the UE monitors the PDCCH monitoring occasion (1*f*-10) which is at least offset O3 before the on duration (1*f*-30). If the 4th TCI state in TCI state list is active, the UE monitors nearest PDCCH monitoring occasion (1*f*-10) which is at least offset O4 before the on duration (1*f*-30**). The UE performs this operation before every on-duration.

Embodiment 1-5

In one method of this disclosure the UE determines PDCCH monitoring occasion for the WUS as follows:
1. The UE receives the search space configuration for the WUS from the gNB.
   A. A list of search space configurations can be signaled by the gNB. Each search space configuration in the list is uniquely identified by a search space identifier. A search space configuration from this list which the UE should use for the WUS can be explicitly indicated by the gNB. The gNB can indicate this by indicating search space identifier for the WUS or by including in the search space configuration a field which indicates that the DCI format for the WUS can be monitored in that search space configuration. The gNB can indicate multiple search space configurations for the WUS. A list of CORESET configurations is signaled by the gNB. Each CORESET configuration in the list is uniquely identified by a CORESET identifier. CORESET identifier of CORESET configuration for the WUS is indicated in search space configuration for the WUS.
      i. The above configuration (list of search space configurations, list of CORESET configurations, and search space identifier for the WUS) can be received by the UE in the RRC message (e.g., RRCReconfiguration message). The configuration can be BWP specific i.e. it is separately signaled for each configured BWPs. The configuration can be provided for all configured BWPs or some of the configured BWPs. The search space identifier for the WUS can be included in PDCCH-configCommon IE. In an embodiment, the search space identifier for the WUS can be indicated to the UE using MAC CE. List of search space configurations can be included in PDCCH-config IE. PDCCH-configCommon and PDCCH-config are included in BWP configuration of serving cell.
   B. A search space configuration and CORESET configuration which the UE should use for the WUS can be explicitly indicated by the gNB.
      i. This configuration can be received by the UE in the RRC message (e.g., RRCReconfiguration message). The configuration can be BWP specific i.e. it is separately signaled for each configured BWPs. The configuration can be provided for all configured BWPs or some of the configured BWPs. Search space configuration for the WUS can be included in PDCCH-config IE.

If the search space/CORESET configuration to be used for the WUS is BWP specific, the UE shall determine the PDCCH monitoring occasions for the WUS using the active DL BWP's search space/CORESET configuration for the WUS. Here active DL BWP is the active DL BWP of serving cell where the UE monitors the PDCCH for the WUS. If the search space/CORESET configuration to be used for the WUS is BWP specific, the UE monitors for PDCCH for the WUS (or in other words WUS is considered configured) if search space/CORESET configuration to be used for the WUS is signaled for the active BWP. Otherwise, if the search space/CORESET configuration to be used for the WUS is not BWP specific, the UE shall determine the PDCCH monitoring occasions for the WUS using the serving cell's search space/CORESET configuration for the WUS wherein the serving cell is the one where the UE monitors the PDCCH for the WUS. In an embodiment serving cell is the SpCell. In an alternate embodiment, search space/CORESET configuration for the WUS is signaled only for serving cell where the UE needs to monitor WUS. So serving cell where the UE monitors the PDCCH for the WUS is the serving cell for which WUS configuration is signaled. In an embodiment wherein multiple DRX groups are configured, the UE monitors WUS only in one serving cell as explained above (e.g., only in SpCell) and this WUS is applied only for non-secondary DRX group or alternately this WUS is applied for both DRX groups. In another embodiment, wherein multiple DRX groups are configured, the UE monitors WUS for different DRX groups in different serving cell. For non-secondary DRX group, the UE monitors WUS in SpCell. For secondary DRX group, the UE monitors WUS in a serving cell signaled by the gNB.

2. The UE receives the RNTI (i.e. PS-RNTI) for the WUS from the gNB.
   A. This can be received by the UE in the RRC message (e.g., RRCReconfiguration message). In an embodiment, PS-RNTI is common for all configured BWPs of a serving cell. In an alternate embodiment, PS-RNTI is BWP specific i.e. it is separately signaled for each configured BWPs. The PS-RNTI can be provided for all configured BWPs or some of the configured BWPs.
   If the PS-RNTI to be used for the WUS is BWP specific, the UE shall use the PS-RNTI in the active DL BWP's configuration. Here active DL BWP is the active DL BWP of serving cell where the UE monitors the PDCCH for the WUS. Otherwise, the UE shall use PS-RNTI of serving cell wherein the serving cell is the one where the UE monitors the PDCCH for the WUS. In an embodiment serving cell is the SpCell. In an alternate embodiment, PS-RNTI for the WUS is signaled only for serving cell where the UE needs to monitor WUS. So serving cell where the UE monitors the PDCCH for the WUS is the serving cell for which WUS configuration is signaled.
3. The UE receives a list of one or more PDCCH monitoring occasion numbers for the WUS from the gNB.
   A. This can be received by the UE in the RRC message (e.g., RRCReconfiguration message). In an embodiment, list is common for all configured BWPs of a serving cell. In an alternate embodiment, list is BWP specific i.e. it is separately signaled for each configured BWPs. The list can be provided for all configured BWPs or some of the configured BWPs.
   If the list of PDCCH monitoring occasion numbers to be used for the WUS is BWP specific, the UE shall use the list of PDCCH monitoring occasion numbers in the active DL BWP's configuration. Here active DL BWP is the active DL BWP of serving cell where the UE monitors the PDCCH for the WUS. Otherwise, the UE shall use list of PDCCH monitoring occasion numbers of serving cell wherein the serving cell is the one where the UE monitors the PDCCH for the WUS. In an embodiment serving cell is the SpCell. In an alternate embodiment, list of PDCCH monitoring occasion numbers for the WUS is signaled only for serving cell where the UE needs to monitor WUS. So serving cell where the UE monitors the PDCCH for the WUS is the serving cell for which WUS configuration is signaled.
   In an embodiment, instead of list of PDCCH monitoring occasion numbers, PDCCH monitoring occasion number can be indicated for each TCI state in TCI state list.
4. The PDCCH monitoring occasions configured by the search space for the WUS, are sequentially numbered in a system frame number (SFN) cycle starting from SFN 0.
   A. In an embodiment, in a TDD cell, amongst the PDCCH monitoring occasions configured by the search space for the WUS, the PDCCH monitoring occasions which overlap with UL symbols are excluded i.e. considered as invalid. The remaining PDCCH monitoring occasions are considered as valid. The PDCCH monitoring occasions configured by the search space for the WUS, PDCCH monitoring occasions which are not overlapping with UL symbols are sequentially numbered starting from SFN 0. In other words, the valid PDCCH monitoring occasions from the PDCCH monitoring occasions configured by the search space for the WUS, are sequentially numbered starting from SFN 0.
      i. In an embodiment, the UL symbols are determined according to tdd-UL-DL-ConfigurationCommon IE received from the gNB (e.g., in SIB1).
   B. In an embodiment, in a TDD cell, amongst the PDCCH monitoring occasions configured by the search space for the WUS, the PDCCH monitoring occasions which overlap with UL symbols or flexible symbols are excluded i.e. considered as invalid. The remaining PDCCH monitoring occasions are considered as valid. The PDCCH monitoring occasions configured by the search space for the WUS, PDCCH monitoring occasions which are not overlapping with UL symbols or flexible symbols are sequentially numbered starting from SFN 0. In other words, the valid PDCCH monitoring occasions from the PDCCH monitoring occasions configured by the search space for the WUS, are sequentially numbered starting from SFN 0.
      i. In an embodiment, the UL symbols and flexible symbols are determined according to tdd-UL-DL-ConfigurationCommon IE received from the gNB (e.g., in SIB1).
5. If i-th TCI state is active in TCI state list of CORESET or CORESET configuration of WUS, the UE monitors the PDCCH monitoring occasion identified by PDCCH monitoring occasion number in the i-th entry of list of PDCCH monitoring occasions numbers. Alternately, if i-th TCI state is active in TCI state list of CORESET or CORESET configuration of WUS, the UE monitors the PDCCH monitoring occasion identified by PDCCH monitoring occasion number corresponding to the i-th TCI state.
   A. CORESET configuration associated with a search space includes a list of TCI states. One of the TCI state in TCI state list is activated and indicated to the UE by the gNB. TCI state indicates the DL TX beam (DL TX beam is QCLed with SSB/CSI RS of TCI state) used by the gNB for transmission of PDCCH.
   It is to be noted that multiple PDCCH monitoring occasion numbers can be signaled for each TCI state. In an embodiment slot numbers and/or subframe number and/or radio frame number can be signaled for each TCI state and the UE can monitor the PDCCH monitoring occasions configured by search space for the WUS in the indicated slot numbers and/or subframe number and/or radio frame number corresponding to the activated TCI state.

Embodiment 1-6

In one method of this disclosure the UE determines PDCCH monitoring occasion for the WUS as follows:
1. The UE receives the search space configuration for the WUS from the gNB.
   A. A list of search space configurations can be signaled by the gNB. Each search space configuration in the list is uniquely identified by a search space identifier. A search space configuration from this list which the UE should use for the WUS can be explicitly indicated by the gNB. The gNB can indicate this by indicating search space identifier for the WUS or by including in the search space configuration a field which indicates that the DCI format for the WUS can be monitored in that search space configuration. The gNB can indicate multiple search space configurations for the WUS. A list of CORESET configurations is signaled by the gNB. Each CORESET configuration in the list is uniquely identified by a CORESET identifier. CORESET identifier of CORESET configuration for the WUS is indicated in search space configuration for the WUS.
      i. The above configuration (list of search space configurations, list of CORESET configurations, and search space identifier for the WUS) can be received by the UE in the RRC message (e.g., RRCReconfiguration message). The configuration can be BWP specific i.e. it is separately signaled for each configured BWPs. The configuration can be provided for all configured BWPs or some of the configured BWPs. The search space identifier for the WUS can be included in PDCCH-configCommon IE. In an embodiment, the search space identifier for the WUS can be indicated to the UE using MAC CE. List of search space configurations can be included in PDCCH-config IE. PDCCH-configCommon and PDCCH-config are included in BWP configuration of serving cell.
B. A search space configuration and CORESET configuration which the UE should use for the WUS can be explicitly indicated by the gNB.
   i. This configuration can be received by the UE in the RRC message (e.g., RRCReconfiguration message). The configuration can be BWP specific i.e. it is separately signaled for each configured BWPs. The configuration can be provided for all configured BWPs or some of the configured BWPs. Search space configuration for the WUS can be included in PDCCH-config IE.

If the search space/CORESET configuration to be used for the WUS is BWP specific, the UE shall determine the PDCCH monitoring occasions for the WUS using the active DL BWP's search space/CORESET configuration for the WUS. Here active DL BWP is the active DL BWP of serving cell where the UE monitors the PDCCH for the WUS. If the search space/CORESET configuration to be used for the WUS is BWP specific, the UE monitors for PDCCH for the WUS (or in other words WUS is considered configured) if search space/CORESET configuration to be used for the WUS is signaled for the active BWP. Otherwise, if the search space/CORESET configuration to be used for the WUS is not BWP specific, the UE shall determine the PDCCH monitoring occasions for the WUS using the serving cell's search space/CORESET configuration for the WUS wherein the serving cell is the one where the UE monitors the PDCCH for the WUS. In an embodiment serving cell is the SpCell. In an alternate embodiment, search space/CORESET configuration for the WUS is signaled only for serving cell where the UE needs to monitor WUS. So serving cell where the UE monitors the PDCCH for the WUS is the serving cell for which WUS configuration is signaled. In an embodiment wherein multiple DRX groups are configured, the UE monitors WUS only in one serving cell as explained above (e.g., only in SpCell) and this WUS is applied only for non-secondary DRX group or alternately this WUS is applied for both DRX groups. In another embodiment, wherein multiple DRX groups are configured, the UE monitors WUS for different DRX groups in different serving cell. For non-secondary DRX group, the UE monitors WUS in SpCell. For secondary DRX group, the UE monitors WUS in a serving cell signaled by the gNB.

2. The UE receives the RNTI (i.e. PS-RNTI) for the WUS from the gNB.
   A. This can be received by the UE in the RRC message (e.g., RRCReconfiguration message). In an embodiment, PS-RNTI is common for all configured BWPs of a serving cell. In an alternate embodiment, PS-RNTI is BWP specific i.e. it is separately signaled for each configured BWPs. The PS-RNTI can be provided for all configured BWPs or some of the configured BWPs.

If the PS-RNTI to be used for the WUS is BWP specific, the UE shall use the PS-RNTI in the active DL BWP's configuration. Here active DL BWP is the active DL BWP of serving cell where the UE monitors the PDCCH for the WUS. Otherwise, the UE shall use PS-RNTI of serving cell wherein the serving cell is the one where the UE monitors the PDCCH for the WUS. In an embodiment serving cell is the SpCell. In an alternate embodiment, PS-RNTI for the WUS is signaled only for serving cell where the UE needs to monitor WUS. So serving cell where the UE monitors the PDCCH for the WUS is the serving cell for which WUS configuration is signaled.

3. The UE receives a list of one or more PDCCH monitoring occasion numbers for the WUS from the gNB.
   A. This can be received by the UE in the RRC message (e.g., RRCReconfiguration message). In an embodiment, list is common for all configured BWPs of a serving cell. In an alternate embodiment, list is BWP specific i.e. it is separately signaled for each configured BWPs. The list can be provided for all configured BWPs or some of the configured BWPs.

If the list of PDCCH monitoring occasion numbers to be used for the WUS is BWP specific, the UE shall use the list of PDCCH monitoring occasion numbers in the active DL BWP's configuration. Here active DL BWP is the active DL BWP of serving cell where the UE monitors the PDCCH for the WUS. Otherwise, the UE shall use list of PDCCH monitoring occasion numbers of serving cell wherein the serving cell is the one where the UE monitors the PDCCH for the WUS. In an embodiment serving cell is the SpCell. In an alternate embodiment, list of PDCCH monitoring occasion numbers for the WUS is signaled only for serving cell where the UE needs to monitor WUS. So serving cell where the UE monitors the PDCCH for the WUS is the serving cell for which WUS configuration is signaled.

In an embodiment, instead of list of PDCCH monitoring occasion numbers, PDCCH monitoring occasion number can be indicated for each TCI state in TCI state list.

4. The PDCCH monitoring occasions configured by the search space for the WUS, are sequentially numbered (from zero or from 1) in each DRX cycle. In an embodiment, DRX cycle length is the short DRX cycle length. In an alternate embodiment, DRX cycle length is the long DRX cycle length. DRX cycle is period between start of two consecutive on-durations.
   A. In an embodiment, in a TDD cell, amongst the PDCCH monitoring occasions configured by the search space for the WUS, the PDCCH monitoring occasions which overlap with UL symbols are excluded i.e. considered as invalid. The remaining PDCCH monitoring occasions are considered as valid. The PDCCH monitoring occasions configured by the search space for the WUS, PDCCH monitoring occasions which are not overlapping with UL symbols are sequentially numbered (from zero or from 1) in each DRX cycle. In other words, the valid PDCCH monitoring occasions from the PDCCH monitoring occasions configured by the search space for the WUS, are sequentially numbered starting from SFN 0.
      i. In an embodiment, the UL symbols are determined according to tdd-UL-DL-ConfigurationCommon IE received from the gNB (e.g., in SIB1).
   B. In an embodiment, in a TDD cell, amongst the PDCCH monitoring occasions configured by the search space for the WUS, the PDCCH monitoring occasions which overlap with UL symbols or flexible symbols are excluded i.e. considered as invalid. The remaining PDCCH monitoring occasions are considered as valid. The PDCCH monitoring occasions configured by the search space for the WUS, PDCCH monitoring occasions which are not overlapping with UL symbols or flexible symbols are sequentially numbered in each DRX cycle. In other words, the valid PDCCH monitoring occasions from the PDCCH monitoring occasions configured by the search space for the WUS, are sequentially numbered in each DRX cycle.
  i. In an embodiment, the UL symbols and flexible symbols are determined according to tdd-UL-DL-ConfigurationCommon IE received from the gNB (e.g., in SIB1).
C. if the Short DRX Cycle is used, and [(SFN×10)+subframe number] modulo (drx-ShortCycle)=(drx-StartOffset) modulo (drx-ShortCycle); or
if the Long DRX Cycle is used, and [(SFN×10)+subframe number] modulo (drx-LongCycle)=drx-StartOffset:
on duration starts after drx-SlotOffset from the beginning of the subframe. drx-ShortCycle, drx-LongCycle, drx-StartOffset are signaled by the gNB.
5. If i-th TCI state is active in TCI state list of CORESET or CORESET configuration of the WUS, the UE monitors the PDCCH monitoring occasion identified by PDCCH monitoring occasion number in the i-th entry of list of PDCCH monitoring occasions numbers. Alternately, if i-th TCI state is active in TCI state list of CORESET or CORESET configuration of WUS, the UE monitors the PDCCH monitoring occasion identified by PDCCH monitoring occasion number corresponding to the i-th TCI state.
  A. CORESET configuration associated with a search space includes a list of TCI states. One of the TCI state in TCI state list is activated and indicated to the UE by the gNB. TCI state indicates the DL TX beam (DL TX beam is QCLed with SSB/CSI RS of TCI state) used by the gNB for transmission of PDCCH.
It is to be noted that multiple PDCCH monitoring occasion numbers can be signaled for each TCI state.

Embodiment 1-7

In one method of this disclosure the UE determines PDCCH monitoring occasion for the WUS as follows:
1. UE receives the search space configuration for the WUS from the gNB.
  A. A list of search space configurations can be signaled by the gNB. Each search space configuration in the list is uniquely identified by a search space identifier. A search space configuration from this list which the UE should use for the WUS can be explicitly indicated by the gNB. The gNB can indicate this by indicating search space identifier for the WUS or by including in the search space configuration a field which indicates that the DCI format for the WUS can be monitored in that search space configuration. The gNB can indicate multiple search space configurations for the WUS. A list of CORESET configurations is signaled by the gNB. Each CORESET configuration in the list is uniquely identified by a CORESET identifier. CORESET identifier of CORESET configuration for the WUS is indicated in search space configuration for the WUS.
    i. The above configuration (list of search space configurations, list of CORESET configurations, and search space identifier for the WUS) can be received by the UE in the RRC message (e.g., RRCReconfiguration message). The configuration can be BWP specific i.e. it is separately signaled for each configured BWPs. The configuration can be provided for all configured BWPs or some of the configured BWPs. The search space identifier for the WUS can be included in PDCCH-configCommon IE. List of search space configurations can be included in PDCCH-config IE. PDCCH-configCommon and PDCCH-config are included in BWP configuration of serving cell.
  B. A search space configuration and CORESET configuration which the UE should use for the WUS can be explicitly indicated by the gNB.
    i. This configuration can be received by the UE in the RRC message (e.g., RRCReconfiguration message). The configuration can be BWP specific i.e. it is separately signaled for each configured BWPs. The configuration can be provided for all configured BWPs or some of the configured BWPs. Search space configuration for the WUS can be included in PDCCH-config IE.

If the search space/CORESET configuration to be used for the WUS is BWP specific, the UE shall determine the PDCCH monitoring occasions for the WUS using the active DL BWP's search space/CORESET configuration for the WUS. Here active DL BWP is the active DL BWP of serving cell where the UE monitors the PDCCH for the WUS. If the search space/CORESET configuration to be used for the WUS is BWP specific, the UE monitors for PDCCH for the WUS (or in other words WUS is considered configured) if search space/CORESET configuration to be used for the WUS is signaled for the active BWP. Otherwise, if the search space/CORESET configuration to be used for the WUS is not BWP specific, the UE shall determine the PDCCH monitoring occasions for the WUS using the serving cell's search space/CORESET configuration for the WUS wherein the serving cell is the one where the UE monitors the PDCCH for the WUS. In an embodiment serving cell is the SpCell. In an alternate embodiment, search space/CORESET configuration for the WUS is signaled only for serving cell where the UE needs to monitor WUS. So serving cell where the UE monitors the PDCCH for the WUS is the serving cell for which WUS configuration is signaled. In an embodiment wherein multiple DRX groups are configured, the UE monitors WUS only in one serving cell as explained above (e.g., only in SpCell) and this WUS is applied only for non-secondary DRX group or alternately this WUS is applied for both DRX groups. In another embodiment, wherein multiple DRX groups are configured, the UE monitors WUS for different DRX groups in different serving cell. For non-secondary DRX group, the UE monitors WUS in SpCell. For secondary DRX group, the UE monitors WUS in a serving cell signaled by the gNB.

2. The UE receives the RNTI (i.e. PS-RNTI) for the WUS from the gNB.
  A. This can be received by the UE in the RRC message (e.g., RRCReconfiguration message). In an embodiment, PS-RNTI is common for all configured BWPs of a serving cell. In an alternate embodiment, PS-RNTI is BWP specific i.e. it is separately signaled for each configured BWPs. The PS-RNTI can be provided for all configured BWPs or some of the configured BWPs.

If the PS-RNTI to be used for the WUS is BWP specific, the UE shall use the PS-RNTI in the active DL BWP's configuration. Here active DL BWP is the active DL BWP of serving cell where the UE monitors the PDCCH for the WUS. Otherwise, the UE shall use PS-RNTI of serving cell wherein the serving cell is the one where the UE monitors the PDCCH for the WUS. In an embodiment serving cell is the SpCell. In an alternate embodiment, PS-RNTI for the WUS is signaled only for serving cell where the UE needs to monitor WUS. So serving cell where the UE monitors the PDCCH for the WUS is the serving cell for which WUS configuration is signaled.

3. The UE receives a list of one or more PDCCH monitoring occasion numbers for the WUS from the gNB.
  A. This can be received by the UE in the RRC message (e.g., RRCReconfiguration message). In an embodiment, list is common for all configured BWPs of a serving cell. In an alternate embodiment, list is BWP specific i.e. it is separately signaled for each configured BWPs. The list can be provided for all configured BWPs or some of the configured BWPs.

If the list of PDCCH monitoring occasion numbers to be used for the WUS is BWP specific, the UE shall use the list of PDCCH monitoring occasion numbers in the active DL BWP's configuration. Here active DL BWP is the active DL BWP of serving cell where the UE monitors the PDCCH for the WUS. Otherwise, the UE shall use list of PDCCH monitoring occasion numbers of serving cell wherein the serving cell is the one where the UE monitors the PDCCH for the WUS. In an embodiment serving cell is the SpCell. In an alternate embodiment, list of PDCCH monitoring occasion numbers for the WUS is signaled only for serving cell where the UE needs to monitor WUS. So serving cell where the UE monitors the PDCCH for the WUS is the serving cell for which WUS configuration is signaled.

In an embodiment, instead of list of PDCCH monitoring occasion numbers, PDCCH monitoring occasion number can be indicated for each TCI state in TCI state list.

5. The UE receives the length of WUS monitoring window from the gNB.
  A. The length can be in slots. Duration of slot is determined based on SCS. It can be one or multiple slots. In an embodiment, length of WUS monitoring window can be pre-defined (e.g., 1 slot) and hence not signaled by the gNB.
  B. This can be received by the UE in the RRC message (e.g., RRCReconfiguration message). In an embodiment, length of WUS monitoring window is common for all configured BWPs of a serving cell. In an alternate embodiment, length of WUS monitoring window is BWP specific i.e. it is separately signaled for each configured BWPs. The length of WUS monitoring window can be provided for all configured BWPs or some of the configured BWPs.
  C. WUS monitoring window starts at 'offset+monitoring window length' from the on-duration. WUS monitoring window ends at an offset from the on-duration. The UE monitors the PDCCH monitoring occasions configured by the search space for the WUS in the WUS monitoring window. Alternately, WUS monitoring window starts at offset from the on-duration. The WUS monitoring window ends at least 'p' slots before the start of on duration. 'p' can also be signaled by the gNB. Alternately, WUS monitoring window occurs between slot "X" and "X-offset' where X is slot in which on duration starts, WUS monitoring window is first Ts slots given by the duration field of search space configuration for the WUS.
    i. In an embodiment, in a TDD cell, amongst the PDCCH monitoring occasions configured by the search space for the WUS, the PDCCH monitoring occasions which overlap with UL symbols are excluded i.e. considered as invalid. The remaining PDCCH monitoring occasions are considered as valid. Amongst the PDCCH monitoring occasions configured by the search space for the WUS, in the WUS monitoring window, PDCCH monitoring occasions which are not overlapping with UL symbols are monitored by the UE. In other words, in the WUS monitoring window valid PDCCH monitoring occasions for the WUS are monitored by the UE.
  E. In an embodiment, the UL symbols are determined according to tdd-UL-DL-ConfigurationCommon IE received from the gNB (e.g., in SIB1).
    i. In an embodiment, in a TDD cell, amongst the PDCCH monitoring occasions configured by the search space for the WUS, the PDCCH monitoring occasions which overlap with UL symbols or Flexible symbols are excluded i.e. considered as invalid. The remaining PDCCH monitoring occasions are considered as valid. In the WUS monitoring window, PDCCH monitoring occasions configured by the search space for the WUS which are not overlapping with UL symbols or flexible symbols are monitored by the UE. In other words, in the WUS monitoring window valid PDCCH monitoring occasions for the WUS, are monitored by the UE.

6. In an embodiment, the UL symbols and flexible symbols are determined according to tdd-UL-DL-ConfigurationCommon IE received from the gNB (e.g., in SIB1).

If there are multiple PDCCH monitoring occasions for the WUS in WUS monitoring window, upon receiving a PDCCH addressed to PS-RNTI in a PDCCH monitoring occasion in WUS monitoring window, the UE is not required to monitor remaining PDCCH monitoring occasions for the WUS in WUS monitoring window.

Embodiment 1-8

In one method of this disclosure the UE determines PDCCH monitoring occasion for the WUS as follows:

1. The UE receives the search space configuration for the WUS from the gNB.
  A. A list of search space configurations can be signaled by the gNB. Each search space configuration in the list is uniquely identified by a search space identifier. A search space configuration from this list which the UE should use for the WUS can be explicitly indicated by the gNB. The gNB can indicate this by indicating search space identifier for the WUS or by including in the search space configuration a field which indicates that the DCI format for the WUS can be monitored in that search space configuration. The gNB can indicate multiple search space configurations for the WUS. A list of CORESET configurations is signaled by the gNB. Each CORESET configuration in the list is uniquely identified by a CORESET identifier. CORESET identifier of CORESET configuration for the WUS is indicated in search space configuration for the WUS.
    i. The above configuration (list of search space configurations, list of coreset configurations, and search space identifier for the WUS) can be received by the UE in the RRC message (e.g., RRCReconfiguration message). The configuration can be BWP specific i.e. it is separately signaled for each configured BWPs. The configuration can be provided for all configured BWPs or some of the configured BWPs. The search space identifier for the WUS can be included in PDCCH-configCommon IE. List of search space configurations can be included in PDCCH-config IE. PDCCH-configCommon and PDCCH-config are included in BWP configuration of serving cell. In an embodiment, the search space identifier for the WUS can be indicated to the UE using MAC CE.
B. A search space configuration and CORESET configuration which the UE should use for the WUS can be explicitly indicated by the gNB.
  i. This configuration can be received by the UE in the RRC message (e.g., RRCReconfiguration message). The configuration can be BWP specific i.e. it is separately signaled for each configured BWPs. The configuration can be provided for all configured BWPs or some of the configured BWPs. Search space configuration for the WUS can be included in PDCCH-config IE.

If the search space/CORESET configuration to be used for the WUS is BWP specific, the UE shall determine the PDCCH monitoring occasions for the WUS using the active DL BWP's search space/CORESET configuration for the WUS. Here active DL BWP is the active DL BWP of serving cell where the UE monitors the PDCCH for the WUS. If the search space/CORESET configuration to be used for the WUS is BWP specific, the UE monitors for PDCCH for the WUS (or in other words WUS is considered configured) if search space/CORESET configuration to be used for the WUS is signaled for the active BWP. Otherwise, if the search space/CORESET configuration to be used for the WUS is not BWP specific, the UE shall determine the PDCCH monitoring occasions for the WUS using the serving cell's search space/CORESET configuration for the WUS wherein the serving cell is the one where the UE monitors the PDCCH for the WUS. In an embodiment serving cell is the SpCell. In an alternate embodiment, search space/CORESET configuration for the WUS is signaled only for serving cell where the UE needs to monitor WUS. So serving cell where the UE monitors the PDCCH for the WUS is the serving cell for which WUS configuration is signaled. In an embodiment wherein multiple DRX groups are configured, the UE monitors WUS only in one serving cell as explained above (e.g., only in SpCell) and this WUS is applied only for non-secondary DRX group or alternately this WUS is applied for both DRX groups. In another embodiment, wherein multiple DRX groups are configured, the UE monitors WUS for different DRX groups in different serving cell. For non-secondary DRX group, the UE monitors WUS in SpCell. For secondary DRX group, the UE monitors WUS in a serving cell signaled by the gNB.

2. The UE receives the RNTI (i.e. PS-RNTI) for the WUS from the gNB.
  A. This can be received by the UE in the RRC message (e.g., RRCReconfiguration message). In an embodiment, PS-RNTI is common for all configured BWPs of a serving cell. In an alternate embodiment, PS-RNTI is BWP specific i.e. it is separately signaled for each configured BWPs. The PS-RNTI can be provided for all configured BWPs or some of the configured BWPs.

If the PS-RNTI to be used for the WUS is BWP specific, the UE shall use the PS-RNTI in the active DL BWP's configuration. Here active DL BWP is the active DL BWP of serving cell where the UE monitors the PDCCH for the WUS. Otherwise, the UE shall use PS-RNTI of serving cell wherein the serving cell is the one where the UE monitors the PDCCH for the WUS. In an embodiment serving cell is the SpCell. In an alternate embodiment, PS-RNTI for the WUS is signaled only for serving cell where the UE needs to monitor WUS. So serving cell where the UE monitors the PDCCH for the WUS is the serving cell for which WUS configuration is signaled.

3. The UE receives the offset for the WUS from the gNB.
  A. This can be received by the UE in the RRC message (e.g., RRCReconfiguration message). In an embodiment, offset is common for all configured BWPs of a serving cell. In an alternate embodiment, offset is BWP specific i.e. it is separately signaled for each configured BWPs. The offset can be provided for all configured BWPs or some of the configured BWPs.

If the offset to be used for the WUS is BWP specific, the UE shall use the offset in the active DL BWP's configuration. Here active DL BWP is the active DL BWP of serving cell where the UE monitors the PDCCH for the WUS. Otherwise, the UE shall use offset of serving cell wherein the serving cell is the one where the UE monitors the PDCCH for the WUS. In an embodiment serving cell is the SpCell. In an alternate embodiment, offset for the WUS is signaled only for serving cell where the UE needs to monitor WUS. So serving cell where the UE monitors the PDCCH for the WUS is the serving cell for which WUS configuration is signaled.

4. Amongst the PDCCH monitoring occasions configured by the search space for the WUS, the UE monitors the nearest PDCCH monitoring occasions which is at least 'offset' away before the on-duration. Alternately, the UE monitors the nearest PDCCH monitoring occasion before the on-duration. Alternately, the UE monitors all the PDCCH monitoring occasions configured by the search space for the WUS.
  A. In an embodiment, in a TDD cell, amongst the PDCCH monitoring occasions configured by the search space for the WUS, the PDCCH monitoring occasions which overlap with UL symbols are excluded i.e. considered as invalid. The remaining PDCCH monitoring occasions are considered as valid. Amongst the PDCCH monitoring occasions configured by the search space for the WUS, the UE monitors nearest PDCCH monitoring occasion which is not overlapping with UL symbols and which is at least offset' away before the on-duration. Alternately, Amongst the PDCCH monitoring occasions configured by the search space for the WUS, the UE monitors nearest PDCCH monitoring occasion which is not overlapping with UL symbols before the on-duration. Alternately, Amongst the PDCCH monitoring occasions configured by the search space for the WUS, the UE monitors all PDCCH monitoring occasions which are not overlapping with UL symbols before the on-duration but outside the UE's active time.
    i. In an embodiment, the UL symbols are determined according to tdd-UL-DL-ConfigurationCommon IE received from the gNB (e.g., in SIB1).
  B. In an embodiment, in a TDD cell, amongst the PDCCH monitoring occasions configured by the search space for the WUS, the PDCCH monitoring occasions which overlap with UL symbols or flexible symbols are excluded i.e. considered as invalid. The remaining PDCCH monitoring occasions are considered as valid. Amongst the PDCCH monitoring occasions configured by the search space for the WUS, the UE monitors nearest PDCCH monitoring occasion which is not overlapping with UL symbols or flexible symbols and which is at least offset' away before the on-duration. Alternately, Amongst the PDCCH monitoring occasions configured by the search space for the WUS, the UE monitors nearest PDCCH monitoring occasion which is not overlapping with UL symbols or flexible symbols before the on-duration. Alternately, Amongst the PDCCH monitoring occasions configured by the search space for the WUS, the UE monitors all PDCCH monitoring occasions which are not overlapping with UL symbols or flexible symbols before the on-duration but outside the UE's active time.

i. In an embodiment, the UL symbols and flexible symbols are determined according to tdd-UL-DL-ConfigurationCommon IE received from the gNB (e.g., in SIB1).

In the embodiments 1-1 to 1-8 in this disclosure, search space/CORESET configuration for the WUS can be separately configured for the short DRX cycle and the long DRX cycle. During the DRX operation, if the UE is in short DRX cycle mode, the UE uses the search space/CORESET configuration for the WUS corresponding to the short DRX cycle. During the DRX operation, if the UE is in a long DRX cycle mode, the UE uses the search space/CORESET configuration for the WUS corresponding to the long DRX cycle. During the DRX operation, upon expiry of the short DRX cycle, the UE uses the search space/CORESET configuration for the WUS corresponding to short DRX cycle. If only one search space/CORESET configuration for the WUS is signaled, the UE applies that for both the short DRX cycle mode and the long DRX cycle mode.

In the embodiments 1-1 to 1-8 in this disclosure, the UE monitors the PDCCH monitoring occasion for the WUS only outside active time.

In an embodiment of the disclosure, if WUS is configured in the active BWP and if both the short DRX cycle and the long DRX cycle are configured, the UE monitors for PDCCH addressed to PS-RNTI for the WUS (where wakeup bit is included in the DCI of received PDCCH) or applies the WUS to determine whether to start the on duration or not only during the short DRX cycle mode. This means that if the UE is in the long DRX cycle mode or is using the long DRX cycle, and [(SFN×10)+subframe number] modulo (drx-LongCycle)=drx-StartOffset it shall always start the start drx-onDurationTimer after drx-SlotOffset from the beginning of the subframe. If the UE is in the short DRX cycle mode or is using the short DRX cycle, and [(SFN×10)+subframe number] modulo (drx-ShortCycle)=drx-StartOffset: if WUS is received, it shall start the start drx-onDurationTimer after drx-SlotOffset from the beginning of the subframe. Otherwise not.

In an alternate embodiment, if WUS is configured in the active BWP and if both the short DRX cycle and the long DRX cycle are configured, the UE monitors the PDCCH addressed to PS-RNTI for the WUS (where wakeup bit is included in the DCI of received PDCCH) or applies the WUS to determine whether to start the on duration or not during the long DRX cycle mode. This means that if the UE is in the short DRX cycle mode or is using the short DRX cycle, and [(SFN×10)+subframe number] modulo (drx-ShortCycle)=drx-StartOffset it shall always start the start drx-onDurationTimer after drx-SlotOffset from the beginning of the subframe. If the UE is in the long DRX cycle mode or is using the long DRX cycle, and [(SFN×10)+subframe number] modulo (drx-LongCycle)=drx-StartOffset: if WUS is received, it shall start the start drx-onDurationTimer after drx-SlotOffset from the beginning of the subframe. Otherwise not. Note that when the UE uses the long DRX cycle and when it uses the short DRX cycle is described earlier.

In an alternate embodiment, if both the short DRX cycle and the long DRX cycle are configured, network can indicate whether to monitor WUS in the short DRX cycle mode or the long DRX cycle mode.

In an embodiment, if there is only one DRX group configured for a CG and WUS is received on SpCell (PDCCH addressed to PS-RNTI is received on SpCell and wakeup bit in DCI is set to 1, WUS is considered received), received WUS is applied (as described above) to all serving cells of CG. In an embodiment, if there are multiple DRX groups configured for a CG and PDCCH addressed to PS-RNTI is received on SpCell and wakeup bit in DCI is set to 1, WUS is considered received and is applied (as described above) to serving cells of non secondary DRX group. In an embodiment, if there are multiple DRX groups configured for a CG and WUS is received on SpCell (PDCCH addressed to PS-RNTI is received on SpCell and wakeup bit in DCI is set to 1, WUS is considered received), received WUS is applied to serving cells of both non secondary DRX group and secondary DRX groups. In an embodiment, if there are multiple DRX groups configured for a CG and PDCCH addressed to PS-RNTI is received on SpCell and wakeup bit in DCI for non secondary DRX group is set to 1, WUS is considered received and applied to serving cells of non secondary DRX group. In an embodiment, if there are multiple DRX groups configured for a CG and PDCCH addressed to PS-RNTI is received on SpCell and wakeup bit in DCI for secondary DRX group is set to 1, WUS is considered received and applied to serving cells of secondary DRX group.

Embodiments 1 to 8 above has been described for monitoring WUS for connected mode DRX cycle. However, these methods can also be applied for monitoring WUS for idle/inactive mode DRX cycle. In case of idle mode, 'on duration' in Embodiments 1 to 8 is equivalent to paging occasion wherein the UE monitors the PDCCH addressed to P-RNTI for receiving paging message. The UE monitors WUS before the paging occasion and only if WUS is received, the UE monitors the PDCCH addressed to P-RNTI in its PO. In case of idle mode search space configurations/coreset, RNTI for the WUS monitoring and offset for the WUS monitoring as defined in embodiments 1 to 8 can be signaled in system information instead of RRCReconfiguration message. In case of the idle mode DRX cycle these configurations are signaled for initial DL BWP i.e. active BWP in idle/inactive.

Figure 1G:
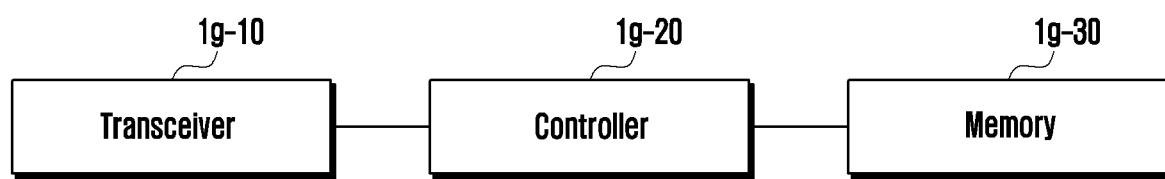
FIG. 1G is a block diagram of a terminal according to an embodiment of the disclosure.

FIG. 1G is a block diagram of a terminal according to an embodiment of the disclosure.

Referring to FIG. 1G, a terminal includes a transceiver 1g-10, a controller 1g-20 and a memory 1g-30. The controller 1g-20 may refer to a circuitry, an application-specific integrated circuit (ASIC), or at least one processor. The transceiver 1g-10, the controller 1g-20 and the memory 1g-30 are configured to perform the operations of the UE illustrated in the figures, e.g., FIGS. 1A to 1F, or described above. Although the transceiver 1g-10, the controller 1g-20 and the memory 1g-30 are shown as separate entities, they may be realized as a single entity like a single chip. Or, the transceiver 1g-10, the controller 1g-20 and the memory 1g-30 may be electrically connected to or coupled with each other.

The transceiver 1g-10 may transmit and receive signals to and from other network entities, e.g., a base station.

The controller 1g-20 may control the terminal to perform functions according to one of the embodiments described above. For example, the controller 1g-20 controls the transceiver 1g-10 and/or memory 1g-30 to perform receiving at least one parameter related with PMO for the WUS and monitoring PMO for the WUS before on duration.

In an embodiment, the operations of the terminal may be implemented using the memory 1g-30 storing corresponding program codes. Specifically, the terminal may be equipped with the memory 1g-30 to store program codes implementing desired operations. To perform the desired operations, the controller 1g-20 may read and execute the program codes stored in the memory 1g-30 by using at least one processor or a central processing unit (CPU).

Figure 1H:
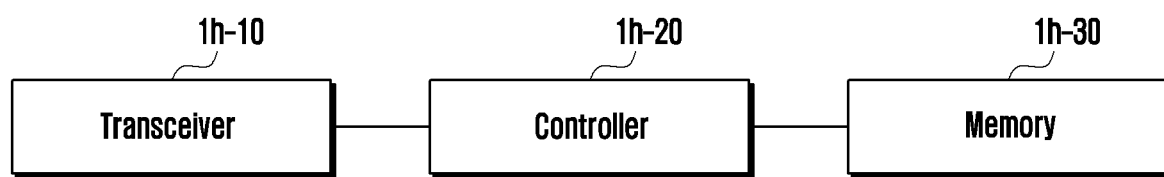
FIG. 1H is a block diagram of a base station according to an embodiment of the disclosure.

FIG. 1H is a block diagram of a base station according to an embodiment of the disclosure.

Referring to FIG. 1H, a base station includes a transceiver 1h-10, a controller 1h-20 and a memory 1h-30. The controller 1h-20 may refer to a circuitry, an application-specific integrated circuit (ASIC), or at least one processor. The transceiver 1h-10, the controller 1h-20 and the memory 1h-30 are configured to perform the operations of the UE illustrated in the figures, e.g., FIGS. 1A to 1F, or described above. Although the transceiver 1h-10, the controller 1h-20 and the memory 1h-30 are shown as separate entities, they may be realized as a single entity like a single chip. Or, the transceiver 1h-10, the controller 1h-20 and the memory 1h-30 may be electrically connected to or coupled with each other.

The transceiver 1h-10 may transmit and receive signals to and from other network entities, e.g., a terminal.

The controller 1h-20 may control the UE to perform functions according to one of the embodiments described above. For example, the controller 1h-20 controls the transceiver 1h-10 and/or memory 1h-30 to perform transmitting at least one parameter related with PMO for the WUS and transmitting WUS in PMO for the WUS before on duration.

In an embodiment, the operations of the base station may be implemented using the memory 1h-30 storing corresponding program codes. Specifically, the base station may be equipped with the memory 1h-30 to store program codes implementing desired operations. To perform the desired operations, the controller 1h-20 may read and execute the program codes stored in the memory 1h-30 by using at least one processor or a central processing unit (CPU).

Embodiment 2—Apparatus and Method of Securing Unicast V2X Communication

In the 5G wireless communication system, random access (RA) is supported. Random access (RA) is used to achieve UL time synchronization. RA is used during initial access, handover, RRC connection re-establishment procedure, scheduling request transmission, secondary cell group (SCG) addition/modification, beam failure recovery and data or control information transmission in UL by non-synchronized UE in RRC_CONNECTED state. Several types of random access procedure is supported.

Contention based random access (CBRA): This is also referred as 4 step CBRA. In this type of random access, the UE first transmits Random Access preamble (also referred as Msg1) and then waits for Random access response (RAR) in the RAR window. RAR is also referred as Msg2. The gNB transmits the RAR on PDSCH. PDCCH scheduling the PDSCH carrying RAR is addressed to random access-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by the gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where the UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

Several RARs for various Random access preambles detected by the gNB can be multiplexed in the same RAR MAC PDU by the gNB. An RAR in MAC PDU corresponds to the UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable (configured by the gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to C-RNTI included in Msg3, contention resolution is considered successful, contention resolution timer is stopped and RA procedure is completed. While the contention resolution timer is running, if the UE receives contention resolution MAC CE including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and the UE has not yet transmitted the RA preamble for a configurable number of times, the UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for Scell, etc. Evolved node B (eNB) assigns to the UE dedicated Random access preamble. The UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RAPID of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and the UE has not yet transmitted the RA preamble for a configurable (configured by the gNB in RACH configuration) number of times, the UE retransmits the RA preamble.

For certain events such has handover and beam failure recovery if dedicated preamble(s) are assigned to the UE, during first step of random access i.e. during random access resource selection for Msg1 transmission UE determines whether to transmit dedicated preamble or non-dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by the gNB, the UE selects non dedicated preamble. Otherwise, the UE select dedicated preamble. So during the RA procedure, one random access attempt can be CFRA while other random access attempt can be CBRA.

2 step contention based random access (2 step CBRA): In the first step, the UE transmits random access preamble on PRACH and a payload on PUSCH. The random access preamble and payload transmission is also referred as MsgA. In the second step, after MsgA transmission, the UE monitors for a response from the network (i.e. the gNB) within a configured window. The response is also referred as MsgB. If CCCH SDU was transmitted in MsgA payload, the UE performs contention resolution using the contention resolution information in MsgB. If C-RNTI was transmitted in MsgA payload, the contention resolution is successful if the UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, the UE transmits Msg3 and perform contention resolution using Msg4 as in CBRA procedure. If contention resolution is successful, random access procedure is considered successfully completed. If contention resolution fails upon fallback (i.e. upon transmitting Msg3), the UE retransmits MsgA. If configured window in which the UE monitors network response after transmitting MsgA expires and the UE has not received MsgB including contention resolution information or fallback information as explained above, the UE retransmits MsgA. If the random access procedure is not successfully completed even after transmitting the msgA configurable number of times, the UE fallbacks to 4 step RACH procedure i.e., the UE only transmits the PRACH preamble.

MsgA payload may include one or more of common control channel (CCCH) SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include the UE ID (e.g., random ID, S-TMSI, C-RNTI, resume ID, etc.) along with preamble in first step. The UE ID may be included in the MAC PDU of the MsgA. The UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then the UE ID is the random ID. When the UE perform RA in IDLE state after it is attached to network, the UE ID is S-TMSI. If the UE has an assigned C-RNTI (e.g., in connected state), the UE ID is C-RNTI. In case the UE is in INACTIVE state, the UE ID is resume ID. In addition to the UE ID, some addition ctrl information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case the gNB assigns to the UE, dedicated Random access preamble (s) and PUSCH resource(s) for MsgA transmission. RO(s) to be used for preamble transmission may also be indicated. In the first step, the UE transmits random access preamble on PRACH and a payload on PUSCH using the contention free random access resources (i.e. dedicated preamble/PUSCH resource/RO). In the second step, after MsgA transmission, the UE monitors for a response from the network (i.e. the gNB) within a configured window. If the UE receives PDCCH addressed to C-RNTI, random access procedure is considered successfully completed.

4G and 5G wireless communication system supports vehicular communication services. Vehicular communication services, represented by vehicle to everything (V2X) services, can consist of the following four different types: vehicle to vehicle (V2V), vehicle to infrastructure (V2I), vehicle to network (V2N) and vehicle to pedestrian (V2P). In fifth generation (or NR) wireless communication system, V2X sidelink communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

Figure 2A:
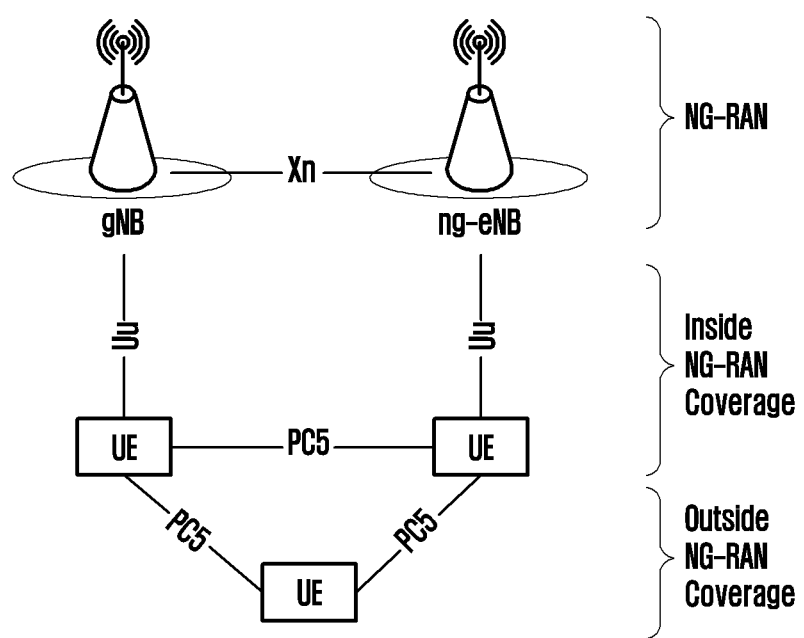
FIG. 2A illustrates an example of a next generation radio access network (NG-RAN) architecture associated with a PC5 interface according to an embodiment of the disclosure.

FIG. 2A illustrates an example of a next generation radio access network (NG-RAN) architecture associated with a PC5 interface according to an embodiment of the disclosure.

V2X services can be provided by PC5 interface and/or Uu interface. Support of V2X services via PC5 interface is provided by NR sidelink communication or V2X sidelink communication, which is a mode of communication whereby the UEs can communicate with each other directly over the PC5 interface using NR technology or EUTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface as illustrated in FIGS. 1A to 1G. Sidelink transmission and reception over the PC5 interface are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes. First, unicast transmission, characterized by support of at least one PC5-RRC connection between peer UEs; Transmission and reception of control information and user traffic between peer UEs in sidelink; Support of sidelink HARQ feedback; Support of radio link control (RLC) AM; and Support of sidelink RLM for both peer UEs to detect RLF. Second, groupcast transmission, characterized by: Transmission and reception of user traffic among the UEs belonging to a group in sidelink; Support of sidelink HARQ feedback. Third, broadcast transmission, characterized by: Transmission and reception of user traffic among the UEs in sidelink.

The access stratum (AS) protocol stack for the control plane in the PC5 interface consists of RRC, packet data convergence protocol (PDCP), RLC and MAC sublayer, and the physical layer. The AS protocol stack for user plane in the PC5 interface consists of service data adaptation protocol (SDAP), PDCP, RLC and MAC sublayer, and the physical layer. The UE supporting NR sidelink communication can operate in two modes for resource allocation:

Scheduled resource allocation (also referred as mode 1), characterized by:
  The UE needs to be RRC_CONNECTED in order to transmit data;
  The UE requests transmission resources from the gNB. The gNB schedules transmission resources for transmission of sidelink control information and data.
The UE autonomous resource selection (also referred as mode 2), characterized by:
  The UE on its own selects resources from resource pools and performs transport format selection to transmit sidelink control information and data;
  The UE performs sensing for (re)selection of sidelink resources. Based on sensing results, the UE (re) selects some specific sidelink resources and reserves multiple sidelink resources.

Hereinafter, security Key Establishment for one to one communication is explained.

Figure 2B:
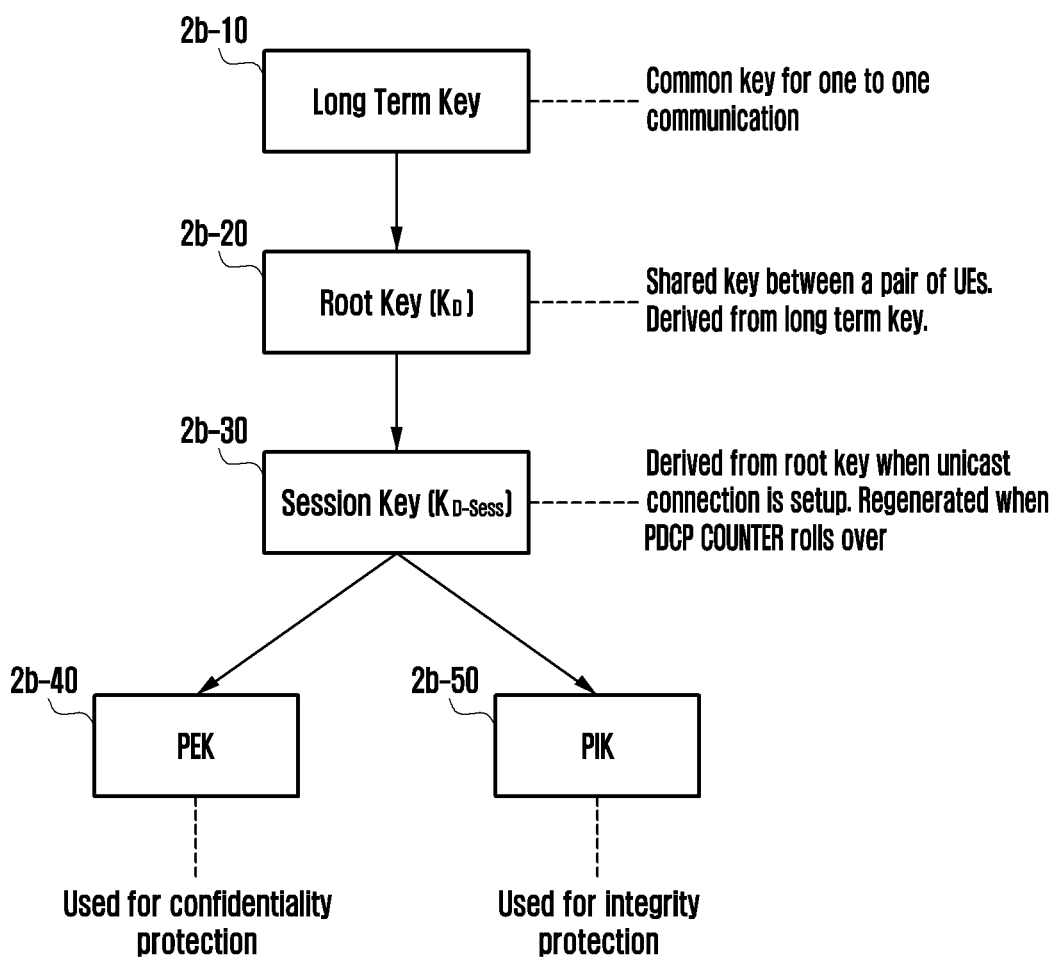
FIG. 2B illustrates an example of different layers of security keys according to an embodiment of the disclosure.

FIG. 2B illustrates an example of different layers of security keys in according to an embodiment of the disclosure. Referring to FIG. 2B, for securing PC5-S signaling message of one to one or unicast communication, four different layers of keys are used as shown in FIGS. 2A to 2N.

Long term key (2b-10): This is the key that is provisioned into the UE and is the root of the security for one-to-one communications. The long term key is identified by the Long term ID. It's a common key for one to one communication.

$K_D$ (2b-20): This is a 256-bit root key that is shared between the two entities communicating using one-to-one communications. It may be refreshed by re-running the authentication signalling using the Long term key. In order to generate a $K_{D\text{-}sess}$ (the next layer of keys), nonces are exchanged between the communicating entities. $K_D$ may be kept even when the UEs have no active one-to-one communication session between them. The $K_D$ ID is used to identify $K_D$.

$K_{D\text{-}sess}$ (2b-30): This is the 256-bit key that is the root of the actual security context that is being used to protect the transfer of data between the UEs. Derived from root key when unicast connection is setup. During a communication between the UEs, the $K_{D\text{-}sess}$ may be refreshed (e.g., when PDCP counter rolls over) by running the rekeying procedure. The actual keys that are used in the confidentiality and integrity algorithms are derived directly from $K_{D\text{-}sess}$. The 16 bit $K_{D\text{-}sess}$ ID identifies the $K_{D\text{-}sess}$.

PEK (2b-40) and PIK (2b-50): The proximity service (ProSe) Encryption Key (PEK) and ProSe Integrity Key (PIK) are used in the chosen confidentiality and integrity algorithms respectively. They are derived from $K_{D\text{-}sess}$ and are refreshed automatically every time $K_{D\text{-}sess}$ is changed.

Figure 2C:
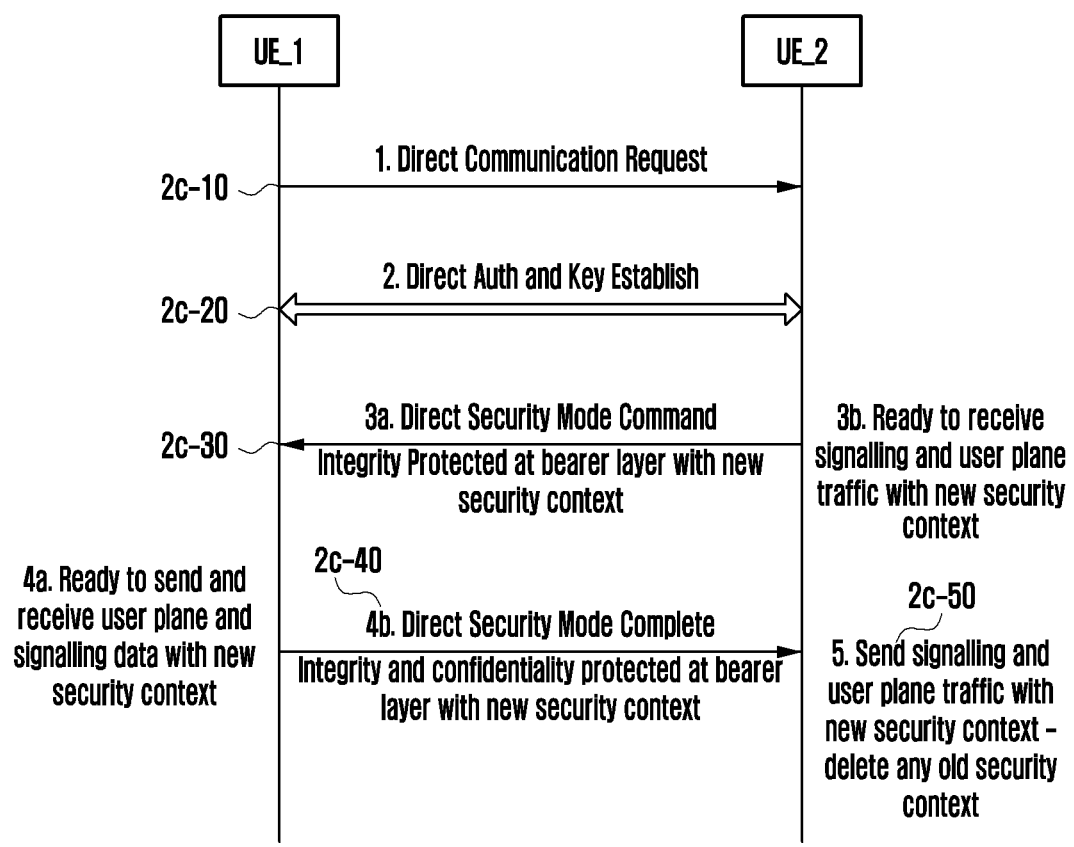
FIG. 2C illustrates an example of establishing security keys during connection setup and rekey procedure according to an embodiment of the disclosure.
Figure 2D:
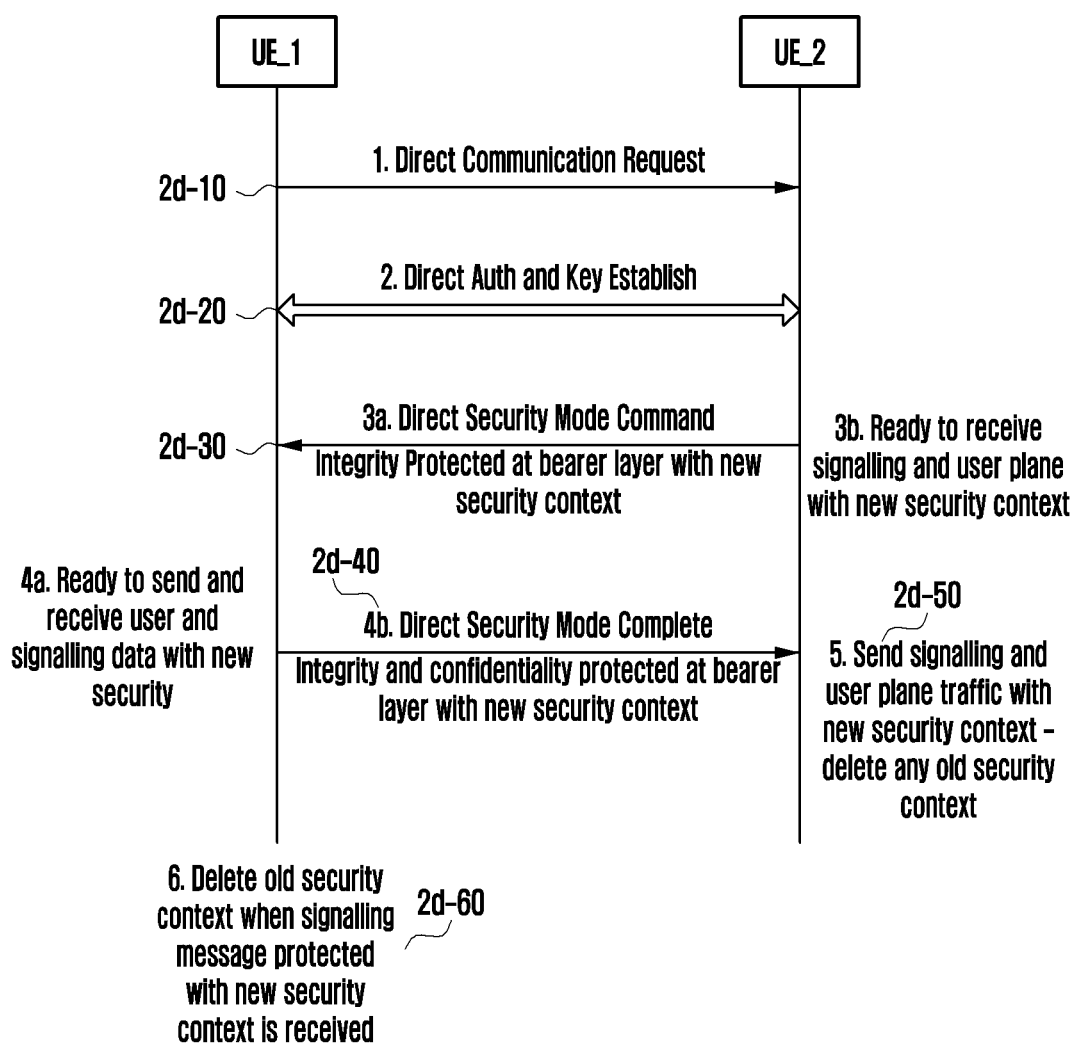
FIG. 2D illustrates another example of establishing security keys during connection setup and rekey procedure according to an embodiment of the disclosure.

FIG. 2C and FIG. 2D illustrate examples of establishing security keys during connection setup and rekey procedure according to various embodiments of the disclosure. The details can be find in 3GPP TS 33.303 and hence omitted here.

Referring to FIG. 2C, in operation 2c-10 a UE_1 transmits a direct communication request to a UE_2. In response, in operation 2c-20 a direct authentication and key establishment occurs between the UE_1 and the UE_2. In operation 2c-30 the UE_2 transmits a direct security mode command to the UE_1. In operation 2c-40, the UE_1 transmits a direct security mode complete message to the UE_2. After which, the each of the UE_1 and the UE-2 can send signaling and user plane traffic with a new security context and delete the old security context on UE_2 in operation 2c-50.

Referring to FIG. 2D, in operation 2d-10 a UE_1 transmits a direct communication request to a UE_2. In response, in operation 2d-20 a direct authentication and key establishment occurs between the UE_1 and the UE_2. In operation 2d-30 the UE_2 transmits a direct security mode command to the UE_1. In operation 2d-40, the UE_1 transmits a direct security mode complete message to the UE_2. After which, the each of the UE_1 and the UE-2 can send signaling and user plane traffic with a new security context and delete the old security context on UE_2 in operation 2d-50. In operation 2d-60, on UE_1 delete the old security context when signaling message protected with the new security context when the context is received.

Hereinafter, protection of the one to one traffic is explained.

Protection for the signaling and user plane data between the UEs is provided at the PDCP layer. As the security is not preserved through a drop of the connection, all signaling messages that need to be sent before security is established, may be sent with no protection. All other signaling messages shall be integrity protected and may be confidentiality protected except the Direct Security Mode Command which is sent integrity protected only.

The bearer with logical channel identifier (LCID)=28 shall be used to carry signaling messages that are not protected.

The bearer with LCID=29 shall be used for Direct Security Mode Command and Direct Security Mode Complete.

The bearer with LCID=30 shall be used for other signaling messages that are confidentiality and integrity protected.

The bearer with LCID=1 to 10 may be used for user plane traffic with confidentiality protection.

Hereinafter, integrity protection is explained.

The input parameters to the integrity algorithm are a 128-bit integrity key named KEY, a 32-bit COUNT, a 5-bit bearer identity called BEARER, the 1-bit direction of the transmission i.e. DIRECTION, and the message itself i.e. MESSAGE.

The KEY used is PIK; PIK is calculated from $K_{D\text{-}sess}$.
When calculating a PIK from $K_{D\text{-}sess}$ the following parameters shall be used to form the input S to the key derivation function (KDF is specified in Annex B of TS 33.220):
FC=0x4B; P0=0x01; L0=length of P0 (i.e. 0x00 0x01); P1=algorithm identity; L1=length of algorithm identity (i.e. 0x00 0x01);
Direction is set to 1 for direct link signaling transmitted by the UE that sent the Direct Security Mode Command for this security context and 0 otherwise;
Bearer[0] to Bearer[4] are set to LCID;
COUNT[0] to COUNT[15] are set to $K_{D\text{-}sess}$ ID; and
Counter is input into COUNT[16] to COUNT[31], where counter is 16 bit PDCP sequence number (SN).

Figure 2E:
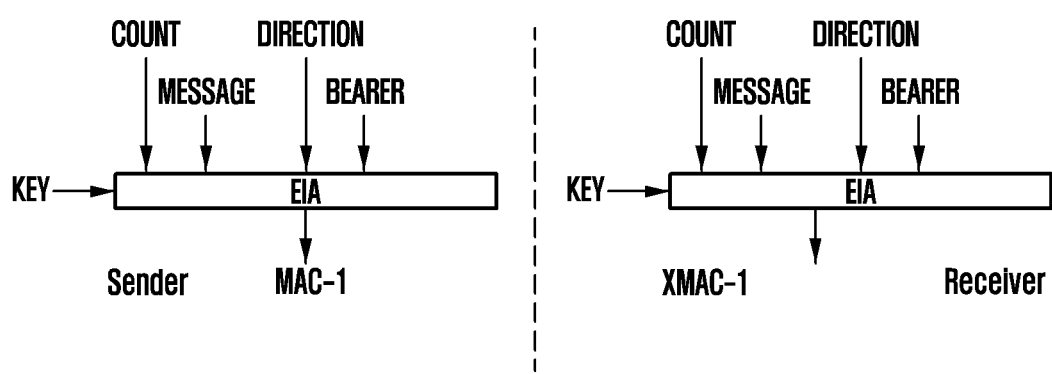
FIG. 2E illustrates an example of a usage of integrity algorithm according to an embodiment of the disclosure.

FIG. 2E illustrates an example of a usage of integrity algorithm EIA to authenticate the integrity of messages in according to an embodiment of the disclosure.

Referring to FIG. 2E, based on these input parameters the sender computes a 32-bit message authentication code (MAC-I) using the integrity algorithm EIA. The message authentication code is then appended to the message when sent. For integrity protection algorithms the receiver computes the expected message authentication code (XMAC-I) on the message received in the same way as the sender computed its message authentication code on the message sent and verifies the data integrity of the message by comparing it to the received message authentication code, i.e. MAC-I.

Hereinafter, confidentiality protection is explained.

The input parameters to the ciphering algorithm are a 128-bit cipher key named KEY, a 32-bit COUNT, a 5-bit bearer identity BEARER, the 1-bit direction of the transmission i.e. DIRECTION, and the length of the key stream required i.e. LENGTH.

The KEY used is PEK; PEK is calculated from $K_{D\text{-}sess}$.
When calculating a PIK from $K_{D\text{-}sess}$ the following parameters shall be used to form the input S to the key derivation function (KDF is specified in Annex B of TS 33.220):
FC=0x4B; P0=0x00; L0=length of P0 (i.e. 0x00 0x01); P1=algorithm identity; L1=length of algorithm identity (i.e. 0x00 0x01);
Direction is set to 1 for direct link signalling transmitted by the UE that sent the Direct Security Mode Command for this security context and 0 otherwise;
Bearer[0] to Bearer[4] are set to LCID;
COUNT[0] to COUNT[15] are set to $K_{D\text{-}sess}$ ID; and
Counter is input into COUNT[16] to COUNT[31], where counter is 16 bit PDCP SN.

Figure 2F:
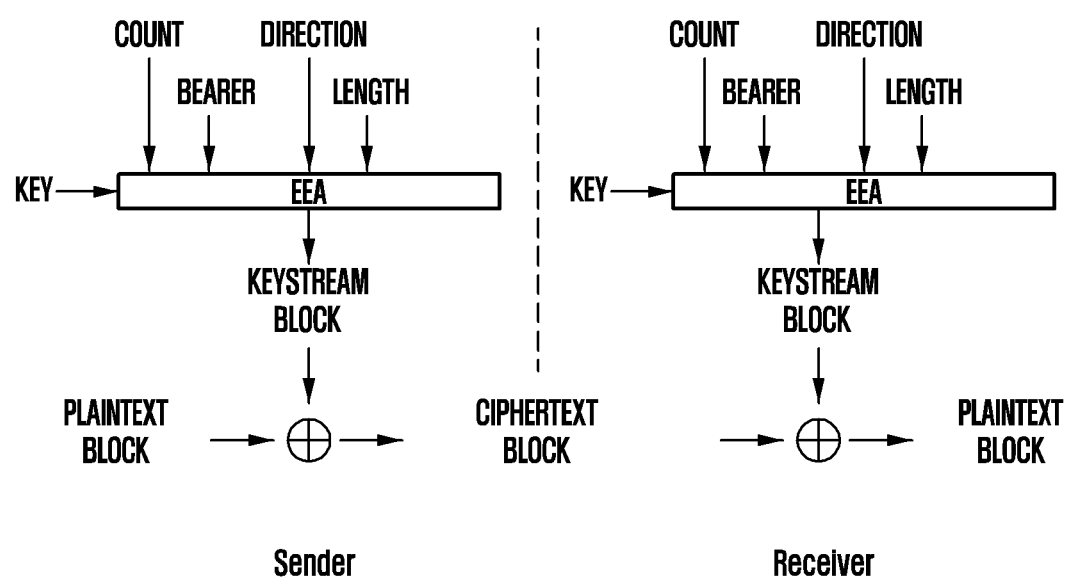
FIG. 2F illustrates an example of a usage of ciphering algorithm according to an embodiment of the disclosure.

FIG. 2F illustrates an example of a usage of ciphering algorithm EEA to encrypt plaintext by applying a keystream using a bit per bit binary addition of the plaintext and the keystream, according to an embodiment of the disclosure.

The plaintext may be recovered by generating the same keystream using the same input parameters and applying a bit per bit binary addition with the ciphertext.

Based on the input parameters the algorithm generates the output keystream block KEYSTREAM which is used to encrypt the input plaintext block PLAINTEXT to produce the output ciphertext block CIPHERTEXT.

The input parameter LENGTH shall affect only the length of the KEYSTREAM BLOCK, not the actual bits in it.

Several issues regarding the above mentioned procedures are described below.

Issue 1: In 4G wireless communication system, signaling messages for unicast communication are generated by PC5 protocol layer and carries over user plane radio bearers. In 5G wireless communication system, RRC between the UEs is also supported for unicast communication. So in additional to signaling messages generated by PC5 protocol layer, signaling messages are also generated by RRC. The issue is which security keys are used for integrity and confidentiality protection of RRC messages exchanged between the UEs for unicast communication.

Issue 2: In LTE based V2X communication, only PDCP SN is used in PDCP operations. In NR based V2X communication, in PDCP operation both PDCP SN and hyper frame number (HFN) are supported. HFN is updated when PDCP SN rolls over. If only PDCP SN is used as input to integrity and ciphering algorithm then input parameters (COUNT, DIRECTION, BEARER) will be same for several packets. This is not desirable from security point of view. If only PDCP SN is used, key needs to be refreshed when PDCP SN rolls over to avoid the above issue. However this leads to key refresh which can lead to interruption and signaling overhead.

Issue 3: Several sidelink (SL) radio bearers (RBs) can be established between a given [Source Layer 2 ID, Destination Layer 2 ID] pair. Each SL RB between a [Source Layer 2 ID, Destination Layer 2 ID] pair has unique LCID. The signaling messages are carried over SL RBs. The bearer (S1-SRB0) with LCID=0 shall be used to carry PC5-S signaling messages that are not protected. The bearer (SL-SRB1) with LCID=1 shall be used for PC5-S signaling messages that are integrity protected only i.e. Direct Security Mode Command and Direct Security Mode Complete. The bearer (SL-SRB 2) with LCID=2 shall be used for other PC5-S signaling messages that are confidentiality and integrity protected. The bearer (SL-SRB3) with LCID=3 is used to carry RRC messages.

Figure 2G:
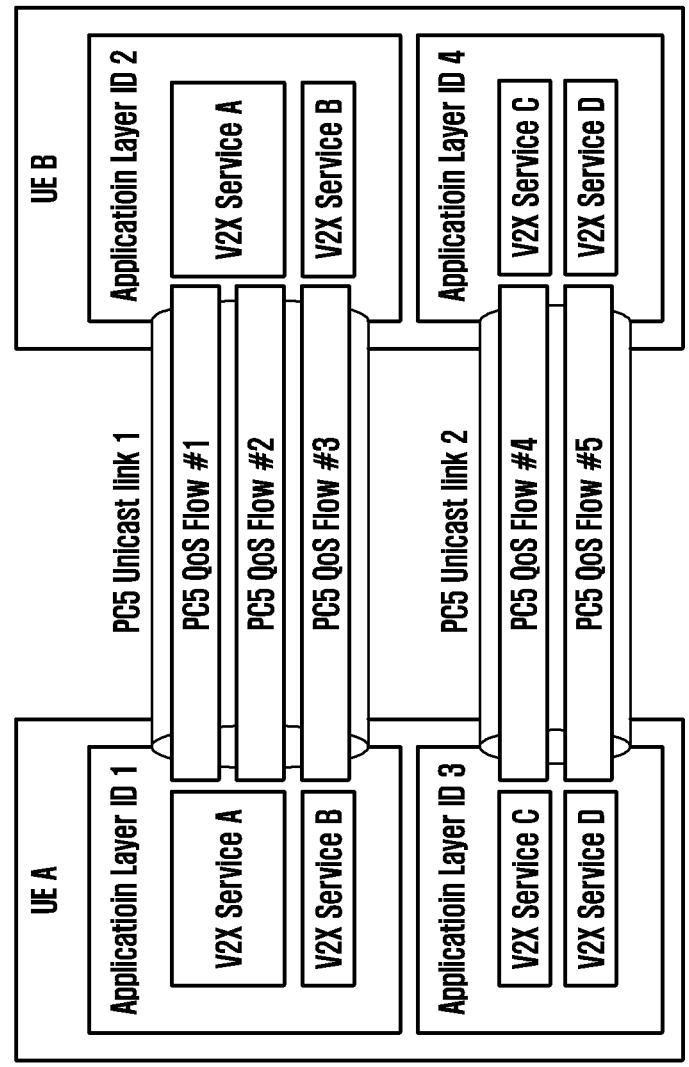
FIG. 2G illustrates an example of multiple unicast links between user equipments (UEs) associated with vehicle to everything (V2X) according to an embodiment of the disclosure.

FIG. 2G illustrates an example of multiple unicast links between user equipments (UEs) associated with V2X according to an embodiment of the disclosure.

Referring to FIG. 2G, in NR, multiple unicast links can be established between same pair of UEs. AUE A sends direct rekey request to a UE B. Source Layer L2 ID, Destination L2 ID and LCID 0 is included in MAC PDU. If multiple unicast links are established between a pair of UEs. Upon receiving the message, the UE B cannot determine the unicast link for which rekeying is requested by the UE A. Same issue will occur for security mode command, security mode complete and other signaling messages.

Issue 4: For V2X communication, the UE needs to acquire V2X SIBs from the camped cell. In NR, V2X SIBs can be provided on demand:
RRC initiates transmission of SI Request which triggers RA procedure;
SI request is transmitted in Msg1 or Msg3 depending on configuration;
Upon reception of SI request ACK, the UE acquires SI from SI window.

In case V2X SIBs are provided on demand, critical/latency sensitive V2X communication can be delayed.

Embodiment 2-1: Integrity/Confidentiality Protection for One to One Communication Issue: In LTE based V2X communication, only PDCP SN is used in PDCP operations. In NR based V2X communication, in PDCP operation both PDCP SN and HFN are supported. HFN is updated when PDCP SN rolls over. If only PDCP SN is used as input to integrity and ciphering algorithm then input parameters (COUNT, DIRECTION, BEARER) will be same for several packets. This is not desirable from security point of view. If only PDCP SN is used, key needs to be refreshed when/before PDCP SN rolls over to avoid the above issue. However this leads to key refresh which can lead to interruption and signaling overhead.

Embodiment 2-1-1: Integrity Protection for One to One Communication

In an embodiment of this disclosure for integrity protection of message, the input parameters to the integrity algorithm are a 128-bit integrity key named KEY, a 48-bit COUNT, a 6-bit bearer identity called BEARER, the 1-bit direction of the transmission i.e. DIRECTION, and the message itself i.e. MESSAGE.

The KEY is the security key used for integrity protection;
Direction is set to 1 for direct link signaling transmitted by the UE that sent the Direct Security Mode Command for this security context and 0 otherwise;
Bearer[0] to Bearer[5] are set to LCID where LCID is 6 bits;
COUNT[0] to COUNT[47] are set to $K_{D\text{-}sess}$ ID+HFN+PDCP SN;
  COUNT[0] to COUNT[15] are set to $K_{D\text{-}sess}$ ID;
  COUNT[16] to COUNT[32] are set to HFN;
  COUNT[33] to COUNT[47] are set to PDCP SN.

FIG. 2E illustrates the use of the integrity algorithm EIA to authenticate the integrity of messages. Based on these input parameters the sender computes a 32-bit message authentication code (MAC-I) using the integrity algorithm EIA. The message authentication code is then appended to the message when sent. For integrity protection algorithms the receiver computes the expected message authentication code (XMAC-I) on the message received in the same way as the sender computed its message authentication code on the message sent and verifies the data integrity of the message by comparing it to the received message authentication code, i.e. MAC-I.

In case the integrity algorithm is 128-EIA2 (128-bit advanced encryption standard (AES) in Cipher-based Message Authentication Code (CMAC) mode), the input parameters and message is encoded as follows:

The bit length of MESSAGE is BLENGTH.
The input to CMAC mode is a bit string M of length Mlen. M is constructed as follows:
  $M_0 \ldots M_{47}$=COUNT[0] . . . COUNT[47]
  $M_{48} \ldots M_{53}$=BEARER[0] . . . BEARER[5]
  $M_{54}$=DIRECTION
  $M_{55} \ldots M_{63}=0^9$ (i.e. 9 zero bits)
  $M_{64} \ldots M_{BLENGTH+63}$=MESSAGE[0] . . . MESSAGE[BLENGTH−1]
and so Mlen=BLENGTH+64.

AES in CMAC mode is used with these inputs to produce a Message Authentication Code T (MACT) of length Tlen=32.

T is used directly as the 128-EIA2 output MACT[0] . . . MACT[31], with MACT[0] being the most significant bit of T.

Embodiment 2-1-2: Confidentiality Protection for One to One Communication

In an embodiment of this disclosure for confidentiality protection, the input parameters to the ciphering algorithm are a 128-bit cipher key named KEY, a 48-bit COUNT, a 6-bit bearer identity BEARER, the 1-bit direction of the transmission i.e. DIRECTION, and the length of the key stream required i.e. LENGTH.

The KEY is the security key used for confidentiality protection;
Direction is set to 1 for direct link signalling transmitted by the UE that sent the Direct Security Mode Command for this security context and 0 otherwise;
Bearer[0] to Bearer[5] are set to LCID where LCID is 6 bits;
COUNT[0] to COUNT[47] are set to $K_{D\text{-}sess}$ ID+HFN+PDCP SN;
  COUNT[0] to COUNT[15] are set to $K_{D\text{-}sess}$ ID;
  COUNT[16] to COUNT[32] are set to HFN;
  COUNT[33] to COUNT[47] are set to PDCP SN.

FIG. 2F illustrates the use of the ciphering algorithm EEA to encrypt plaintext by applying a keystream using a bit per bit binary addition of the plaintext and the keystream. The plaintext may be recovered by generating the same keystream using the same input parameters and applying a bit per bit binary addition with the ciphertext.

Based on the input parameters the algorithm generates the output keystream block KEYSTREAM which is used to encrypt the input plaintext block PLAINTEXT to produce the output ciphertext block CIPHERTEXT.

The input parameter LENGTH shall affect only the length of the KEYSTREAM BLOCK, not the actual bits in it.

In case the integrity algorithm is 128-EEA2 (128-bit AES in counter (CTR) mode), the sequence of 128-bit counter blocks needed for CTR mode $T_1, T_2, \ldots, T_i, \ldots$ shall be constructed as follows:

The most significant 64 bits of $T_1$ consist of COUNT[0] . . . COUNT[47]/BEARER[0] . . . BEARER[5]/DIRECTION/$0^9$ (i.e. 9 zero bits). These are written from most significant on the left to least significant on the right, so for example COUNT[0] is the most significant bit of $T_1$.

The least significant 64 bits of $T_1$ are all 0.

Subsequent counter blocks are then obtained by applying the standard integer incrementing function (according to Appendix B1 in National Institute of Standards and Technology (NIST) Special Publication 800-38A (2001): "Recommendation for Block Cipher Modes of Operation".) mod 264 to the least significant 64 bits of the previous counter block.

Embodiment 2-2: Security Keys for RRC Messages for One to One Communication

Issue: In 4G wireless communication system, signaling messages for unicast communication are generated by PC5 protocol layer and carries over user plane radio bearers. In 5G wireless communication system, RRC between UEs is also supported for unicast communication. So in additional to signaling messages generated by PC5 protocol layer, signaling messages are also generated by RRC. The issue is which security keys are used for integrity and confidentiality protection of RRC messages exchanged between UEs for unicast communication.

Embodiment 2-2-1

Figure 2H:
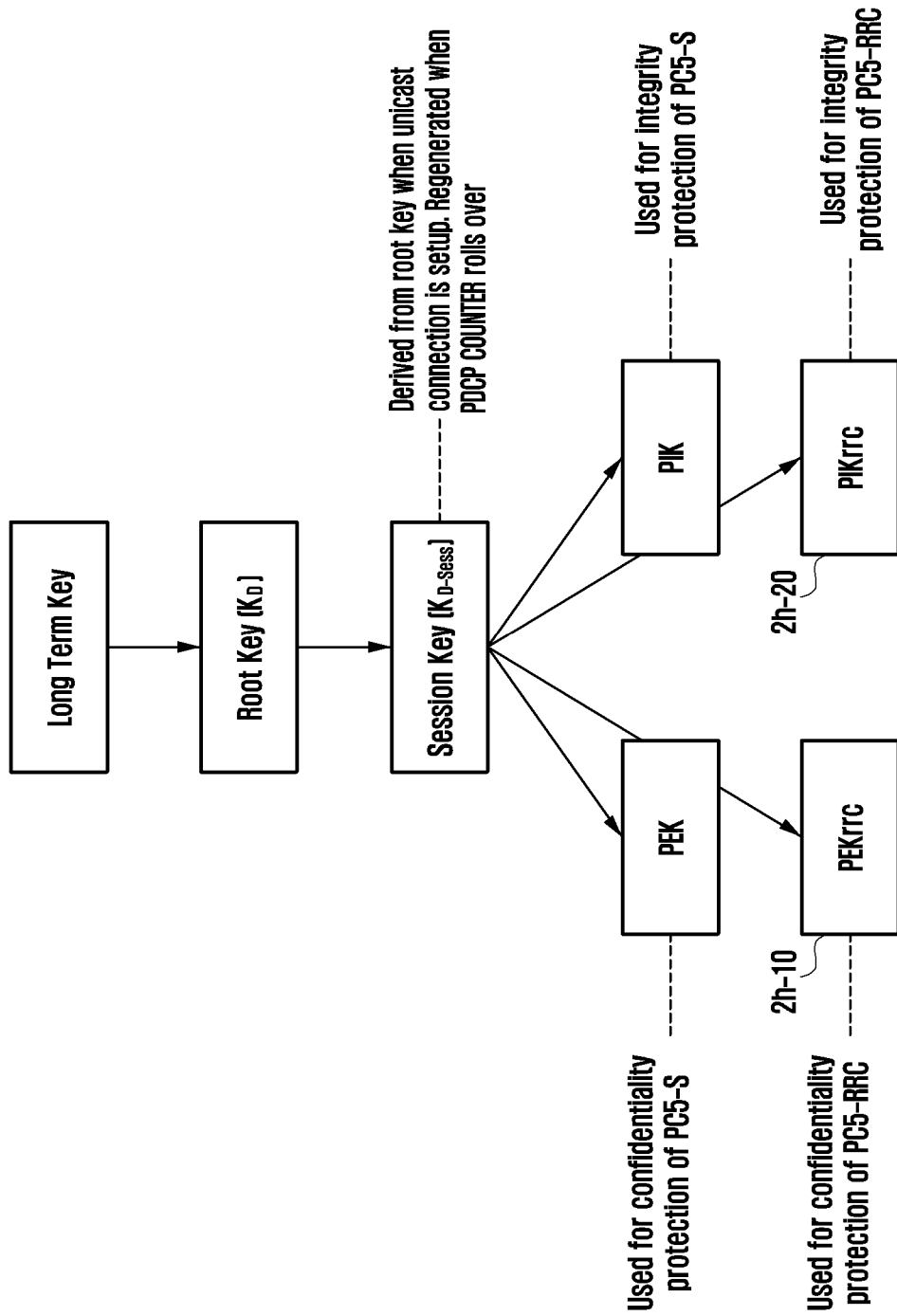
FIG. 2H illustrates an example of security keys hierarchy according to an embodiment of the disclosure.

FIG. 2H illustrates an example of security keys hierarchy in according to an embodiment of the disclosure.

Referring to FIG. 2H, the UE generates two additional security keys (PEKrrc (2h-10) and PIKrrc (2h-20)) from $K_{D\text{-}sess}$ in addition to PIK and PEK. The key hierarchy is shown in FIG. 2H.

PIK is used for integrity protection of PC5-S signaling messages.

PEK is used for confidentiality protection of PC5-S signaling messages.

PIKrrc (2h-20) is used for integrity protection of PC5-RRC signaling messages.

PEKrrc (2h-10) is used for confidentiality protection of PC5-RRC signaling messages.

When generating a PIK or PEK or PEKrrc (2h-10) or PIKrrc (2h-20) from $K_{D\text{-}sess}$, the following parameters shall be used to form the input S to the KDF that is specified in Annex B of TS 33.220:

FC=0x4B;
P0=0x00 if PEK is being derived; or
P0=0x01 if PIK is being derived; or
P0=0x02 if PEKrrc is being derived; or
P0=0x03 if PIKrrc is being derived;
L0=length of P0 (i.e. 0x00 0x01);
P1=algorithm identity (note that algorithm identity can be different for RRC and PC5-S keys);
L1=length of algorithm identity (i.e. 0x00 0x01).

PDCP layer in the UE will then uses one of these keys for protection (using methods explained earlier) depending on the type of message being transmitted and received. If the PDCP counter (i.e. PDCP COUNT comprising of HFN and PDCP SN) of SL RB carrying any of the PC5-S signaling message and/or PC5-RRC signaling message of a unicast connection between a pair of UEs rolls over or is about to roll over, rekeying procedure is initiated to generate a new $K_{D\text{-}sess}$. PEKrrc, PIKrrc, PIK and PEK are then generated again.

Embodiment 2-2-2

Figure 2I:
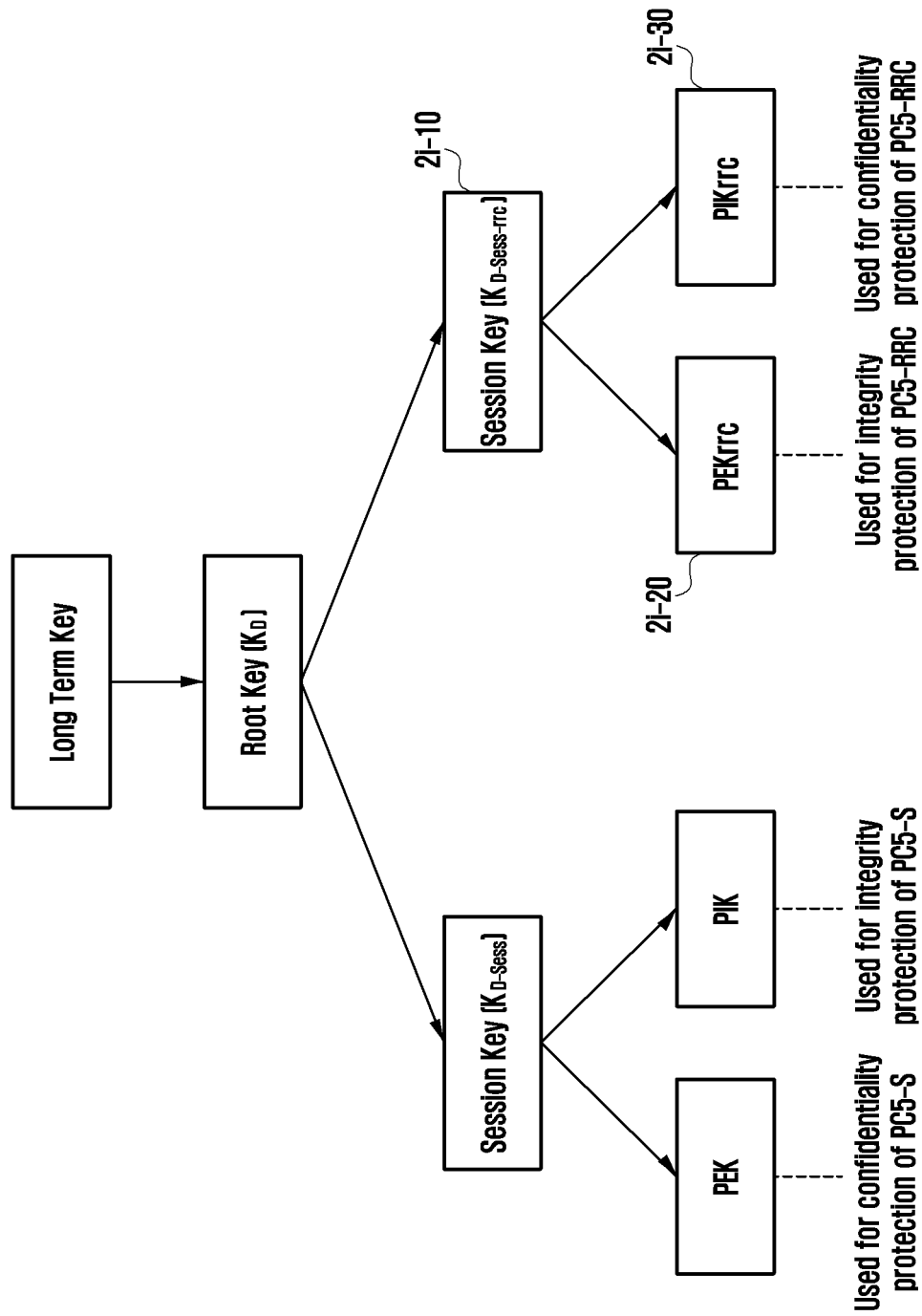
FIG. 2I illustrates another example of security keys according to an embodiment of the disclosure.

FIG. 2I illustrates another example of security keys hierarchy in according to an embodiment of the disclosure.

Referring to FIG. 2I, the UE generates $K_{D\text{-}sess}$ and $K_{D\text{-}sess\text{-}rrc}$ (2i-10) from root key. The key hierarchy is shown in FIG. 2I.

PIK and PEK is then derived from $K_{D\text{-}sess}$.

PIKrrc (2i-30) and PEKrrc (2i-20) is derived from $K_{D\text{-}sess\text{-}rrc}$.

PIK is used for integrity protection of PC5-S signaling messages.

PEK is used for confidentiality protection of PC5-S signaling messages.

PIKrrc (2i-30) is used for integrity protection of PC5-RRC signaling messages.

PEKrrc (2i-20) is used for confidentiality protection of PC5-RRC signaling messages.

When generating a PIK or PEK from $K_{D\text{-}sess}$, the following parameters shall be used to form the input S to the key derivation function (KDF) that is specified in Annex B of TS 33.220:

FC=0x4B
P0=0x00 if PEK is being derived or
P0=0x01 if PIK is being derived
L0=length of P0 (i.e. 0x00 0x01)
P1=algorithm identity (note that algorithm identity can be different for RRC and PC5-S keys)
L1=length of algorithm identity (i.e. 0x00 0x01).

When generating a PEKrrc (2i-20) or PIKrrc (2i-30) from $K_{D\text{-}sess\text{-}rrc}$, the following parameters shall be used to form the input S to the KDF that is specified in Annex B of TS 33.220:

FC=0x4B
P0=0x00 if PEKrrc is being derived or
P0=0x01 if PIKrrc is being derived
L0=length of P0 (i.e. 0x00 0x01)
P1=algorithm identity
L1=length of algorithm identity (i.e. 0x00 0x01).

PDCP layer in the UE will then uses one of these keys for protection (using methods explained earlier) depending on the type of message being transmitted and received.

If the PDCP counter of SL RB carrying PC5-S signaling message of a unicast connection between a pair of UEs rolls over or is about to roll over, rekeying procedure is initiated to generate a new $K_{D\text{-}sess}$. PIK and PEK are then generated again.

If the PDCP counter of SL RB carrying PC5-RRC signaling message of a unicast connection between a pair of UEs rolls over or is about to roll over, rekeying procedure is initiated to generate a new $K_{D\text{-}sess\text{-}rrc}$. PIKrrc and PEKrrc are then generated again.

Embodiment 2-2-3

Figure 2J:
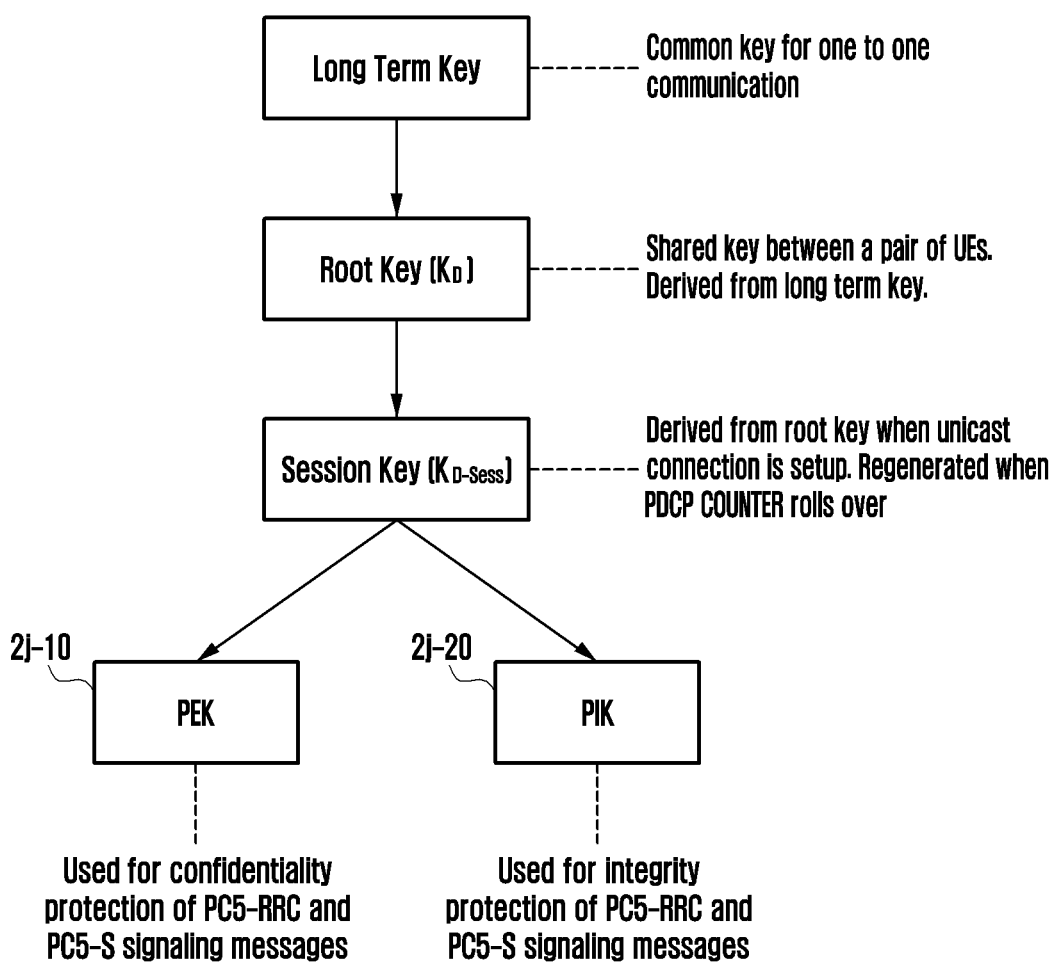
FIG. 2J illustrates another example of security keys hierarchy according to an embodiment of the disclosure.

FIG. 2J illustrates another example of security keys hierarchy in according to an embodiment of the disclosure.

Referring to FIG. 2J, the UE generates two security keys from $K_{D\text{-}sess}$. The key hierarchy is shown in FIG. 2J.

PIK (2j-20) is used for integrity protection of PC5-S and PC5-RRC signaling messages and user traffic.

PEK (2j-10) is used for confidentiality protection of PC5-S and PC5-RRC signaling messages and user traffic.

When generating a PIK or PEK from $K_{D\text{-}sess}$, the following parameters shall be used to form the input S to the KDF that is specified in Annex B of TS 33.220:

FC=constant (e.g., 0x4B or 0x7E), wherein 0x4B is used when communication between pair of UEs is using sidelink communication based on first RAT (i.e. LTE) and 0x7E is used when communication between pair of UEs is using sidelink communication based on second RAT (i.e. NR).
P0=0x00 if PEK is being derived or
P0=0x01 if PIK is being derived or
L0=length of P0 (i.e. 0x00 0x01)
P1=algorithm identity
L1=length of algorithm identity (i.e. 0x00 0x01).

PDCP layer in the UE will then uses one of these keys for protection (using methods explained earlier) of message and user traffic being transmitted and received between a pair of UEs. If the PDCP counter (i.e. PDCP COUNT comprising of HFN and SN) of SL SRB 1 or SL SRB 2 (SL SRB 1 and SL SRB 2 carries PC5-S signaling messages that needs protection) and/or SL SRB 3 (SL SRB3 carries PC5-RRC signaling message) or any SL DRB of a unicast connection between a pair of UEs rolls over or is about to roll over, rekeying procedure is initiated to generate a new $K_{D\text{-}sess}$. PIK and PEK are then generated again.

Embodiment 2-3: Handling Multiple Unicast Connections/Links Associated with Same Source Layer L2 ID, Destination L2 ID Several SL RBs can be established between a given [Source Layer 2 ID, Destination Layer 2 ID] pair. Each SL RB between a [Source Layer 2 ID, Destination Layer 2 ID] pair has unique LCID. The signaling messages are carried over SL SRBs. The bearer (SL-SRB0) with LCID=0 shall be used to carry PC5-S signaling messages that are not protected. The bearer (SL-SRB1) with LCID=1 shall be used for Direct Security Mode Command and Direct Security Mode Complete. The bearer (SL-SRB2) with LCID=2 shall be used for other PC5-S signaling messages that are confidentiality and integrity protected. The bearer (SL-SRB3) with LCID=3 shall be used for other PC5-RRC signaling messages that are confidentiality and integrity protected.

In NR, multiple unicast links can be established between same pair of UEs. The UE A sends direct rekey request to the UE B. Source Layer L2 ID, Destination L2 ID and LCID 0 is included in MAC PDU. If multiple unicast links are established between a pair of UEs. Upon receiving the message, the UE B cannot determine the unicast link for which rekeying is requested by the UE A. Same issue will occur for security mode command, security mode complete and other signaling messages.

Embodiment 2-3-1

In first method of this disclosure, PC5-S message(s) for a [Source Layer L2 ID, Destination L2 ID] pair irrespective of associated unicast link are mapped to one of the three SL radio bearers.

The bearer (SL-SRB0) with LCID=0 carry signaling messages that are not protected.

The bearer (SL-SRB0) with LCID=1 is used for Direct Security Mode Command and Direct Security Mode Complete.

The bearer (SL-SRB0) with LCID=2 is used for other signaling messages that are confidentiality and integrity protected.

Unicast Link ID is included in PDCP header by the transmitter. Upper layer provides the Unicast Link ID to AS along with PC5-S signaling message. Based on this receiver, the UE can map the received message to appropriate Unicast link; apply security context accordingly. In an alternate embodiment, Unicast Link ID can be included in MAC PDU or sidelink control information (SCI).

Let's say there are two unicast links: Link #1 and Link #2 between the UE A and the UE B.
UE A L2 ID: X; UE B L2 ID: Y
UE A sends rekey request for Link #1
Rekey request is mapped to SL RB associated with [Source Layer L2 ID: X, Destination L2 ID: Y, LCID 0]
LinkID is set to Link #1 in PDCP header
[Source Layer L2 ID: X, Destination L2 ID: Y, LCID: 0] is added in MAC header
UE B receives MAC PDU addressed to [Source Layer L2 ID: X, Destination L2 ID: Y, LCID: 0]
  UE maps the received MAC SDUs to SL RB associated with [Source Layer L2 ID: X, Destination L2 ID: Y, LCID 0)
  Based on LCID 0 it knows that this is a signaling message and it is unprotected. Based on LinkID it determines the unicast link for which this packet is associated.

Embodiment 2-3-2

In second method of this disclosure, PC5-S messages for a [Source Layer L2 ID, Destination L2 ID] pair irrespective of associated unicast link are mapped to a single SL radio bearer. The bearer with LCID=X carry all PC5-S signaling messages, where X is pre-defined or reserved.

Unicast Link ID is included in PDCP header by the transmitter. Based on this receiver the UE can map the received message to appropriate Unicast link; apply security context accordingly. In an alternate embodiment, Unicast Link ID can be included in MAC PDU or SCI.

Security protection type is included in PDCP header by the transmitter. Security protection type can be set to No protection; Integrity protected only; both integrity and confidentiality protected. Based on this receiver, the UE can determine the security level and accordingly process the packet.

Let's say there are two unicast links: Link #1 and Link #2 between UE A and UE B.
UE A L2 ID: X; UE B L2 ID: Y
UE A sends signaling message for Link #1
Signaling message is mapped to SL RB associated with [Source Layer L2 ID: X, Destination L2 ID: Y, LCID A]
LinkID is set to Link #1 in PDCP header
[Source Layer L2 ID: X, Destination L2 ID: Y, LCID: A] is added in MAC header
UE B receives MAC PDU addressed to [Source Layer L2 ID: X, Destination L2 ID: Y, LCID: A]
  UE maps the received MAC SDUs to SL RB associated with [Source Layer L2 ID: X, Destination L2 ID: Y, LCID A)
  Based on LCID A it knows that this is a signaling message. Based on LinkID it determines the unicast link for which this packet is associated. Based on Security protection type field it can know whether No protection; Integrity protection only; both integrity and confidentiality protection is applied to received signaling message.

Embodiment 2-3-3

In third method of this disclosure, PC5-S messages for a [Source Layer L2 ID, Destination L2 ID, Unicast Link ID] are mapped to one of the three SL radio bearers.

The bearer (SL-SRB0) with LCID=0 carry signaling messages that are not protected.

The bearer (SL-SRB0) with LCID=1 is used for Direct Security Mode Command and Direct Security Mode Complete.

The bearer (SL-SRB0) with LCID=2 is used for other signaling messages that are confidentiality and integrity protected.

Unicast Link ID is included in MAC PDU by the transmitter. Based on this receiver, the UE can map the received MAC SDU to appropriate SL radio bearer.

Embodiment 2-4-1: MAC PDU Format for Including Link ID (Option 1)

Figure 2K:
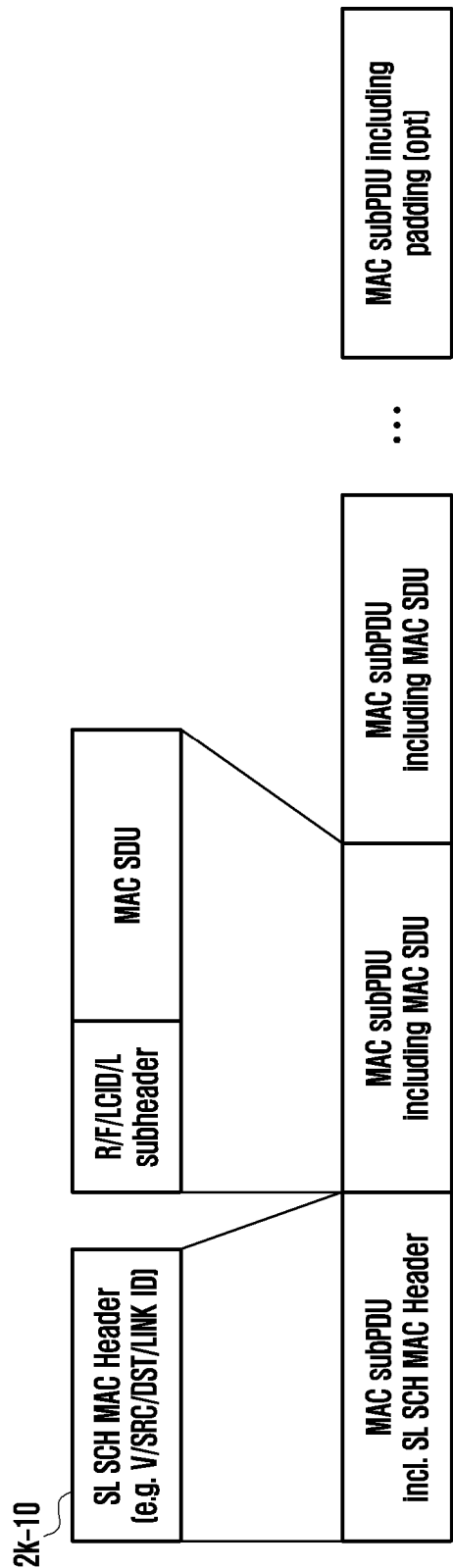
FIG. 2K illustrates an example of a medium access control (MAC) protocol data unit (PDU) structure including link identifier (ID) according to an embodiment of the disclosure.

FIG. 2K illustrates an example of a MAC PDU structure including link ID in according to an embodiment of the disclosure.

Referring to FIG. 2K, Link ID is included in SL SCH MAC header of SL SCH MAC PDU as shown in 2K-10. So, MAC SDU(s) of one unicast link are multiplexed in MAC PDU.

In an embodiment, LINK ID field can be always present in SL SCH MAC header. For broadcast/group cast it can be set to a pre-defined value.

Alternately LINK ID field can be included in SL SCH MAC header only for unicast MAC PDU. Unicast MAC PDU can be indicated via SCI or 1 bit in MAC header or using V bit in MAC header or can be implicitly determined based on L2 ID.

In this option, For each MAC PDU associated to the SCI:
  Operation 1: Select a ProSe Destination, having the sidelink logical channel with the highest priority, among the sidelink logical channels having data available for transmission and having the same transmission format as the one selected corresponding to the ProSe Destination;
  Operation 2: Among the sidelink logical channels belonging to the selected ProSe Destination and having data available for transmission, allocate resources to the sidelink logical channel with the highest priority;
  Operation 3: If the selected logical channel in Operation 2 is unicast: if any resources remain, sidelink logical channels belonging to the selected ProSe Destination and unicast link of logical channel selected in Operation 2 are served in decreasing order of priority until either the data for the sidelink logical channel(s) or the SL grant is exhausted, whichever comes first. Sidelink logical channels configured with equal priority should be served equally.
  Operation 3: If the selected logical channel in Operation 2 is not unicast: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.

Embodiment 2-4-2: MAC PDU Format for Including Link ID (Option 2)

Figure 2L:
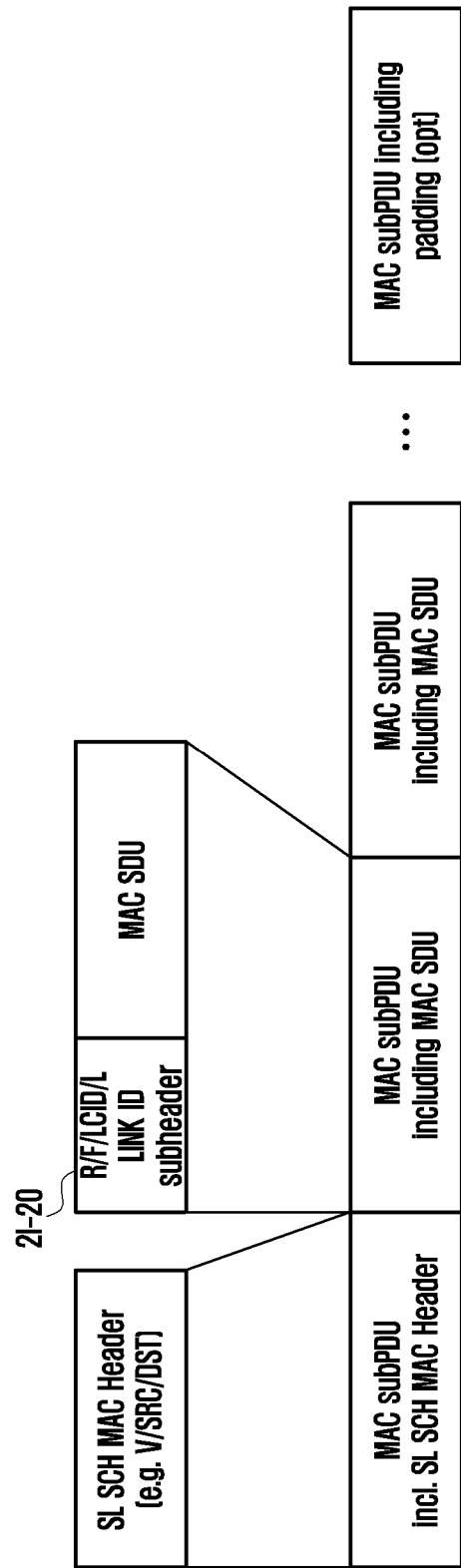
FIG. 2L illustrates another example of MAC PDU structure including link ID according to an embodiment of the disclosure.

FIG. 2L illustrates another example of MAC PDU structure including link ID in according to an embodiment of the disclosure.

Referring to FIG. 2L, Link ID is included in SL SCH MAC sub header of SL SCH MAC SDU in SL SCH MAC PDU as shown in 2l-20. So, MAC SDU(s) of different unicast links can be multiplexed in MAC PDU.

In an embodiment, LINK ID field can be always present in SL SCH MAC sub header. For broadcast/group cast it can be set to a pre-defined value.

Alternately LINK ID field can be included in SL SCH MAC sub header only for unicast MAC PDU. Unicast MAC PDU can be indicated via SCI or 1 bit in MAC header or using V bit in MAC header or can be implicitly determined based on L2 ID.

Embodiment 2-5: Handling Interruption Due to SI Acquisition

Issue: For V2X communication UE needs to acquire V2X SIBs from the camped cell. In NR, V2X SIBs can be provided on demand.
  RRC initiates transmission of SI Request which triggers RA procedure
  SI request is transmitted in Msg1 or Msg3 depending on configuration
  Upon reception of SI request ACK, the UE acquires SI from SI window
  In case V2X SIBs are provided on demand, critical/latency sensitive V2X communication can be delayed.
  Method:
    UE acquires SIB1 from camped/serving cell.
      According to SIB1, V2X SIB(s) are supported in camped/serving cell, V2X SIB(s) are not broadcasted but provided on demand.
    V2X service is initiated. UE initiates acquisition of V2X SIB (s)
    On demand SI request procedure is initiated to acquire V2X SIB(s).
  Until the completion of V2X SIB(s) acquisition
    Option 1: UE uses the exception resource pool for V2X communication, wherein exceptional resource pool is provided in pre-configuration.
    Option 2: UE uses the transmission resource pool(s) in pre-configuration for V2X communication.
    Option 3: UE performs option 1 or option 2 if UE is not in coverage of frequency on which V2X communication needs to be performed.
  Upon completion of V2X SIB(s) acquisition,
    UE uses the resource pools indicated in acquired V2X SIBs for V2X communication (if UE is in Idle/inactive)
    UE requests for resources from the gNB. The UE uses the resources configured in dedicated signaling (if UE is in connected).

Embodiment 2-6: On Demand SI in RRC Connected

In the RRC Connected state for acquiring the SIB(s) which are not being broadcast, UE sends/transmits SI request message (i.e. an RRC message including list of one or more SIB(s) which UE needs) to the gNB.

The gNB sends response (e.g., RRCReconfiguration message) including one or more SIBs requested by UE. If response (e.g., RRCReconfiguration message) cannot accommodate all requested SIBs due to limitation of response message size, some mechanism is needed to obtain the remaining requested SIB(s).
  Option 1: In an embodiment, UE can send request again for SIB(s) which are not included in response (e.g., RRCReconfiguration message).
  Option 2: In an alternate embodiment, the gNB can send multiple responses (e.g., RRCReconfiguration message), each including a sub set of requested SIB(s).
    In this option upon receiving a response (e.g., RRCReconfiguration message), how can UE know whether there are other response (e.g., RRCReconfiguration message) messages or not.
    In an embodiment, if response (e.g., RRCReconfiguration message) does not include all requested SIB(s), UE can wait for some time before sending request again. Waiting time can be UE implementation or pre-defined (e.g., 1s) or configured by the gNB in RRC signaling.
    In an alternate embodiment, response (e.g., RRCReconfiguration message) can include some indication whether remaining SIB(s) are in another response (e.g., RRCReconfiguration message).
  Option 3: In an alternate embodiment, the gNB can broadcast the SIB(s) which are requested but not included in response (e.g., RRCReconfiguration message). So upon receiving response (e.g., RRCReconfiguration message) wherein all requested SIB(s) are not included, the UE assumes that those SIB(s) are broadcasted by the gNB. The UE acquires them from SI window occasions of those SIB(s) in the current modification period. Alternately, the UE acquires them from SI window occasions of those SIB(s) in the next modification period. Alternately, the UE acquires them from SI window occasions of those SIB(s) in the current modification period or next modification period.

In an embodiment, source the gNB forwards the latest SI request message received from the UE to target the gNB during handover. SI request message can be included in IE AS-Context. AS-context is then transmitted to target the gNB in handover preparation message. The advantage is that the UE can avoid sending the SI request message in target cell upon handover. Note that the UE will send SI request message to target cell upon handover if the content of SI request to be sent in target cell is different from content of SI request message last transmitted in the source gNB.

In the current design, if common search space is not configured in active DL BWP, UE does not monitor for SI update indication. It is assumed that updated SI (required in connected state) is provided via dedicated RRC signaling. How does the gNB know which SIB(s) UE need in connected state was not an issue in Rel. 15 as only SIB1 is needed by all the UEs.

Option 1: In an embodiment, the UE can inform the gNB which SIB(s) it needs. So whenever these SIB(s) are updated and common search space for SI acquisition/paging is not configured in active BWP, the gNB provides the updated SIB(s) in dedicated RRC signaling.

Option 2: In another embodiment, the gNB can always provide in dedicated RRC signaling, all updated SIBs which the UE may need in connected, if common search space for SI acquisition/paging is not configured in active BWP.

Option 3: In another embodiment, the gNB may know using other feature specific message/contents, which SIBs are needed by the UE. So whenever these SIB(s) are updated and common search space for SI acquisition/paging is not configured in active BWP, the gNB provides the updated SIB(s) in dedicated RRC signaling.

In an embodiment the SI request procedure in RRC connected can be as follows:

RRC initiates transmission of SI request message (i.e. an RRC message including list of one or more SIB(s) which UE needs) to the gNB.

Upon receiving RLC ACK/HARQ ack for SI request, the UE starts a timer.

Timer is stopped if the UE receives response (e.g., RRCReconfiguration message) corresponding to transmitted SI request. It may include one or more requested SIB(s).

If timer expires, the UE acquires requested SIB(s) from SI window occasions of those SIB(s) in modification period in which RLC ACK/HARQ ack is received.

In an alternate embodiment the SI request procedure in RRC connected can be as follows:

RRC initiates transmission of SI request message (i.e. an RRC message including list of one or more SIB(s) which the UE needs) to the gNB.

UE starts a timer.

Timer is stopped if the UE receives response (e.g., RRCReconfiguration message) corresponding to transmitted SI request. It may include one or more requested SIB(s).

If timer expires, the UE acquires requested SIB(s) from SI window occasions of those SIB(s) in current modification period.

(Alternate) If timer expires, the UE acquires requested SIB(s) from SI window occasions of those SIB(s) in next modification period.

(Alternate) If timer expires, the UE acquires requested SIB(s) from SI window occasions of those SIB(s) in current and next modification period.

In an embodiment, after transmitting the SI request message, the UE waits for response from the gNB. Upon receiving response (e.g., RRCReconfiguration message) wherein requested SIB(s) are not included (i.e. response IE in message is empty), UE assumes that requested SIB(s) are broadcasted by the gNB. The UE acquires them from SI window occasions of those SIB(s) in the current modification period. Alternately, the UE acquires them from SI window occasions of those SIB(s) in the next modification period. Alternately, the UE acquires them from SI window occasions of those SIB(s) in the current modification period or next modification period. In an embodiment, the gNB can indicate the number of modification period(s) or indicate current/next modification period in response (e.g., RRCReconfiguration message) for acquiring requested SIB(s).

Figure 2M:
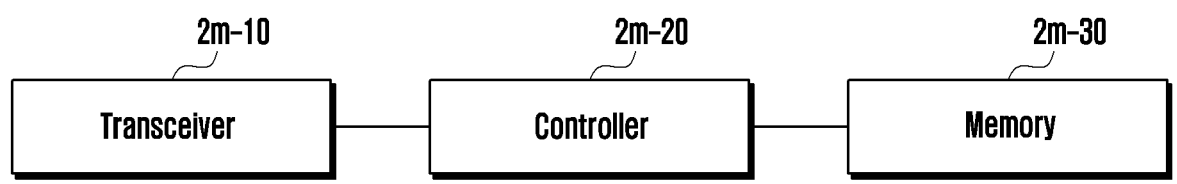
FIG. 2M is a block diagram of a terminal according to an embodiment of the disclosure.
Figure 2N:
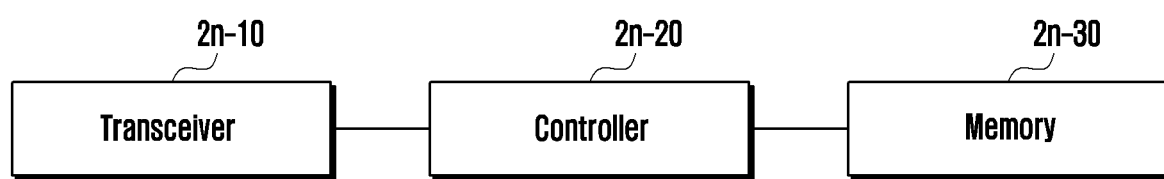
FIG. 2N is a block diagram of a base station according to an embodiment of the disclosure.

FIG. 2M is a block diagram of a terminal according to an embodiment of the disclosure.

Referring to FIG. 2M, a terminal includes a transceiver 2m-10, a controller 2m-20 and a memory 2m-30. The controller 2m-20 may refer to a circuitry, an application-specific integrated circuit (ASIC), or at least one processor. The transceiver 2m-10, the controller 2m-20 and the memory 2m-30 are configured to perform the operations of the UE illustrated in the figures, e.g., FIGS. 2A to 2L, or described above. Although the transceiver 2m-10, the controller 2m-20 and the memory 2m-30 are shown as separate entities, they may be realized as a single entity like a single chip. Or, the transceiver 2m-10, the controller 2m-20 and the memory 2m-30 may be electrically connected to or coupled with each other.

The transceiver 2m-10 may transmit and receive signals to and from other network entities, e.g., a base station.

The controller 2m-20 may control the terminal to perform functions according to one of the embodiments described above. For example, the controller 2m-20 controls the transceiver 2m-10 and/or memory 2m-30 to perform integrity protection and/or confidentiality protection using security keys.

In an embodiment, the operations of the terminal may be implemented using the memory 2m-30 storing corresponding program codes. Specifically, the terminal may be equipped with the memory 2m-30 to store program codes implementing desired operations. To perform the desired operations, the controller 2m-20 may read and execute the program codes stored in the memory 2m-30 by using at least one processor or a central processing unit (CPU).

FIG. 2N is a block diagram of a base station according to an embodiment of the disclosure.

Referring to FIG. 2N, a base station includes a transceiver 2n-10, a controller 2n-20 and a memory 2n-30. The controller 2n-20 may refer to a circuitry, an application-specific integrated circuit (ASIC), or at least one processor. The transceiver 2n-10, the controller 2n-20 and the memory 2n-30 are configured to perform the operations of the UE illustrated in the figures, e.g., FIGS. 2A to 2L, or described above. Although the transceiver 2n-10, the controller 2n-20 and the memory 2n-30 are shown as separate entities, they may be realized as a single entity like a single chip. Or, the transceiver 2n-10, the controller 2n-20 and the memory 2n-30 may be electrically connected to or coupled with each other.

The transceiver 2n-10 may transmit and receive signals to and from other network entities, e.g., a terminal.

The controller 2n-20 may control the UE to perform functions according to one of the embodiments described above. For example, the controller 2n-20 controls the transceiver 2n-10 and/or memory 2n-30 to perform integrity protection and/or confidentiality protection using security keys.

In an embodiment, the operations of the base station may be implemented using the memory 2n-30 storing corresponding program codes. Specifically, the base station may be equipped with the memory 2n-30 to store program codes implementing desired operations. To perform the desired operations, the controller 2n-20 may read and execute the program codes stored in the memory 2n-30 by using at least one processor or a central processing unit (CPU).

While the disclosure has been shown and described with reference to various embodiments thereof, it will be understood by those skilled in the art that various changes in form and details may be made therein without departing from the spirit and scope of the disclosure as defined by the appended claims and their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, a radio resource control (RRC) reconfiguration message including a physical downlink control channel (PDCCH) configuration for a downlink bandwidth part (BWP) of a special cell (SpCell), wherein the RRC reconfiguration message includes search space configuration information for one or more search space configurations and control resource set (CORESET) configuration information for one or more CORESET configurations, information on a power saving radio network temporary identifier (PS-RNTI), and information on a PS offset, wherein a search space configuration among the one or more search space configurations is associated with a wakeup signal (WUS), and the search space configuration is associated with a CORESET configuration among the one or more CORESET configurations;
    identifying a PDCCH monitoring occasion for the WUS based on the search space configuration and the CORESET configuration; and
    receiving, from the base station on the SpCell, downlink control information including the WUS by monitoring the PDCCH monitoring occasion based on the PS-RNTI and the PS offset,
    wherein the search space configuration and the CORESET configuration are BWP specific for the downlink BWP, and
    wherein the PS-RNTI and the PS offset are cell specific for the SpCell.

2. The method of claim 1, wherein, in case that a short discontinuous reception (DRX) cycle and a long DRX cycle are configured for the terminal, the PDCCH monitoring occasion is monitored for the downlink control information including the WUS during the long DRX cycle.

3. The method of claim 1, further comprising:
    performing a discontinuous reception (DRX) operation based on the received WUS.

4. A method performed by a base station in a wireless communication system, the method comprising:
    transmitting, to a terminal, a radio resource control (RRC) reconfiguration message including a physical downlink control channel (PDCCH) configuration for a downlink bandwidth part (BWP) of a special cell (SpCell), wherein the RRC reconfiguration message includes search space configuration information for one or more search space configurations, control resource set (CORESET) configuration information for one or more CORESET configurations, information on a power saving radio network temporary identifier (PS-RNTI), and information on a PS offset, wherein a search space configuration among the one or more search space configurations is associated with a wakeup signal (WUS), and the search space configuration is associated with a CORESET configuration among the one or more CORESET configurations; and
    transmitting, to the terminal on the SpCell, downlink control information including the WUS in a PDCCH monitoring occasion for the WUS based on the search space configuration and the CORESET configuration, the downlink control information being transmitted based on the PS-RNTI and the PS offset,
    wherein the search space configuration and the CORESET configuration are BWP specific for the downlink BWP, and
    wherein the PS-RNTI and the PS offset are cell specific for the SpCell.

5. The method of claim 4, wherein, in case that a short discontinuous reception (DRX) cycle and a long DRX cycle are configured for the terminal, the downlink control information including the WUS is transmitted in the PDCCH monitoring occasion during the long DRX cycle.

6. The method of claim 4, wherein a discontinuous reception (DRX) operation is performed based on the transmitted WUS.

7. A terminal in a wireless communication system, the terminal comprising:
    a transceiver configured to transmit or receive a signal; and
    a controller coupled with the transceiver and configured to:
        receive, from a base station, a radio resource control (RRC) reconfiguration message including a physical downlink control channel (PDCCH) configuration for a downlink bandwidth part (BWP) of a special cell (SpCell), wherein the RRC reconfiguration message includes search space configuration information for one or more search space configurations, control resource set (CORESET) configuration information for one or more CORESET configurations, information on a power saving radio network temporary identifier (PS-RNTI), and information on a PS offset, wherein a search space configuration among the one or more search space configurations is associated with a wakeup signal (WUS), and the search space configuration is associated with a CORESET configuration among the one or more CORESET configurations,
        identify a PDCCH monitoring occasion for the WUS based on the search space configuration and the CORESET configuration, and
        receive, from the base station on the SpCell, downlink control information including the WUS by monitoring the PDCCH monitoring occasion based on the PS-RNTI and the PS offset, wherein the search space configuration and the CORESET configuration are BWP specific for the downlink BWP, and wherein the PS-RNTI and the PS offset are cell specific for the SpCell.

8. The terminal of claim 7, wherein, in case that a short discontinuous reception (DRX) cycle and a long DRX cycle are configured for the terminal, the PDCCH monitoring occasion is monitored for the downlink control information including the WUS during the long DRX cycle.

9. The terminal of claim 7, wherein the controller is further configured to:

perform a DRX operation based on the received WUS.

10. A base station in a wireless communication system, the base station comprising:

a transceiver configured to transmit or receive a signal; and a controller coupled with the transceiver and configured to:

transmit, to a terminal, a radio resource control (RRC) reconfiguration message including a physical downlink control channel (PDCCH) configuration for a downlink bandwidth part (BWP) of a special cell (SpCell), wherein the RRC reconfiguration message includes search space configuration information for one or more search space configurations, control resource set (CORESET) configuration information for one or more CORESET configurations, information on a power saving radio network temporary identifier (PS-RNTI), and information on a PS offset, wherein a search space configuration among the one or more search space configurations is associated with a wakeup signal (WUS), and the search space configuration is associated with a CORESET configuration among the one or more CORESET configurations, and transmit, to the terminal on the SpCell, downlink control information including the WUS in a PDCCH monitoring occasion for the WUS based on the search space configuration and the CORESET configuration, the downlink control information being transmitted based on the PS-RNTI and the PS offset, wherein the search space configuration and the CORESET configuration are BWP specific for the downlink BWP, and wherein the PS-RNTI and the PS offset are cell specific for the SpCell.

11. The base station of claim 10, wherein, in case that a short discontinuous reception (DRX) cycle and a long DRX cycle are configured for the terminal, the downlink control information including the WUS is transmitted in the PDCCH monitoring occasion during the long DRX cycle.

12. The base station of claim 10, wherein a discontinuous reception (DRX) operation is performed based on the transmitted WUS.

* * * * *